United States Patent
Won et al.

(10) Patent No.: US 10,744,843 B2
(45) Date of Patent: Aug. 18, 2020

(54) AIR-CONDITIONING SYSTEM FOR VEHICLE AND CONTROLLING METHOD THEREOF

(71) Applicant: Hanon Systems, Daejeon-si (KR)

(72) Inventors: Jong-Bo Won, Daejeon-si (KR); Tae-Yong Park, Daejeon-si (KR); Yong-Nam Ahn, Daejeon-si (KR); Sung-Je Lee, Daejeon-si (KR); Se-Min Lee, Daejeon-si (KR)

(73) Assignee: HANON SYSTEMS, Daejeon (KR)

( * ) Notice: Subject to any disclaimer, the term of this patent is extended or adjusted under 35 U.S.C. 154(b) by 347 days.

(21) Appl. No.: 15/314,965

(22) PCT Filed: Sep. 14, 2015

(86) PCT No.: PCT/KR2015/009611
§ 371 (c)(1),
(2) Date: Apr. 4, 2017

(87) PCT Pub. No.: WO2016/093472
PCT Pub. Date: Jun. 16, 2016

(65) Prior Publication Data
US 2019/0193510 A1 Jun. 27, 2019

(30) Foreign Application Priority Data
Dec. 10, 2014 (KR) ........................ 10-2014-0177130

(51) Int. Cl.
*B60H 1/00* (2006.01)
*B60N 2/56* (2006.01)

(52) U.S. Cl.
CPC ..... *B60H 1/00278* (2013.01); *B60H 1/00335* (2013.01); *B60H 1/00835* (2013.01);
(Continued)

(58) Field of Classification Search
CPC .......... B60H 1/00278; B60H 1/00285; B60H 1/00335; B60H 1/00835; B60H 2001/003; B60N 2/56
(Continued)

(56) References Cited

U.S. PATENT DOCUMENTS 5,237,831 A * 8/1993 Sikora .................... F24F 13/30
165/86
5,386,704 A * 2/1995 Benedict ............ B60H 1/00007
454/161
(Continued)

FOREIGN PATENT DOCUMENTS

KR         20130015843 A      2/2013

*Primary Examiner* — Joel M Attey
(74) *Attorney, Agent, or Firm* — Shumaker, Loop & Kendrick, LLP; James D. Miller

(57) ABSTRACT

Disclosed herein are air-conditioning systems for a vehicle for a battery, which can control temperature of the vehicle or the battery by delivering air cooled through a first evaporator of a cooling and heating module or air heated through a condenser to a supply side (toward a passenger or a battery). The cooling and heating module includes: a compressor; the condenser; an expansion valve for controlling a flow of the refrigerant condensed in the condenser; the first evaporator for evaporating the refrigerant supplied through the expansion valve; a first-first blowing unit for blowing air through the first evaporator; a first-second blowing unit for blowing air through the condenser; and a discharge duct for selectively delivering the air supplied through the first-first blowing unit and the first-second blowing unit toward the passenger by opening and closing means.

8 Claims, 27 Drawing Sheets

(52) U.S. Cl.
CPC ..... *B60H 1/00899* (2013.01); *B60H 1/00285* (2013.01); *B60H 2001/003* (2013.01); *B60N 2/56* (2013.01)

(58) Field of Classification Search
USPC .......................................................... 62/159
See application file for complete search history.

(56) References Cited

U.S. PATENT DOCUMENTS

| | | | |
|---|---|---|---|
| 10,392,044 B2* | 8/2019 | Repp | B60N 2/5635 |
| 2004/0139754 A1* | 7/2004 | Kamiya | B60N 2/0244 |
| | | | 62/186 |
| 2008/0134715 A1 | 6/2008 | Lewis et al. | |
| 2009/0071178 A1 | 3/2009 | Major et al. | |
| 2013/0042637 A1 | 2/2013 | Richter et al. | |
| 2014/0303835 A1 | 10/2014 | VerWoert et al. | |

\* cited by examiner

| |1st cooling and heating module|2nd cooling and heating module|3rd cooling and heating module|4th cooling and heating module|
|---|---|---|---|---|
|$|\Delta T| \geq$ 4th temperature|○|○|○|○|
|$|\Delta T| \geq$ 3rd temperature|○|○|○|×|
|$|\Delta T| \geq$ 2nd temperature|○|○|×|×|
|$|\Delta T| \geq$ 1st temperature|○|×|×|×|

( $|\Delta T|$ = Difference between measured temperature and target temperature )

1st temperature < 2nd temperature < 3rd temperature < 4th temperature

FIG. 18

| |ΔT| | C ≥ 4th charge amount | C ≥ 3rd charge amount | C ≥ 2nd charge amount | C ≥ 1st charge amount |
|---|---|---|---|---|
| |ΔT| ≥ 4th temperature | D1, D2, D3, D4 | D1, D2, D3, D4 | D1, D2, D3 | D1, D2 |
| |ΔT| ≥ 3rd temperature | D1, D2, D3, D4 | D1, D2, D3 | D1, D2, D3 | D1, D2 |
| |ΔT| ≥ 2nd temperature | D1, D2, D3 | D1, D2 | D1, D2 | D1 |
| |ΔT| ≥ 1st temperature | D1, D2 | D1 | D1 | D1 |

(|ΔT| = Difference between measured temperature and target temperature)

1st temperature < 2nd temperature < 3rd temperature < 4th temperature

C = battery charge amount

FIG. 20

AIR-CONDITIONING SYSTEM FOR VEHICLE AND CONTROLLING METHOD THEREOF

CROSS-REFERENCE TO RELATED APPLICATIONS

This application is a United States national phase application based on PCT/KR2015/009611 filed Sep. 14, 2015 which claims the benefit of Korean Patent Application No. 10-2014-0177130 filed Dec. 10, 2014. The disclosures of the above applications are hereby incorporated herein by reference in their entirety.

TECHNICAL FIELD

The present invention relates to an air-conditioning system for a vehicle and a controlling method thereof, and more particularly, to an air-conditioning system for a vehicle, which can cool and heat the interior of the vehicle or cool a battery of the vehicle through just one module, is possible to be miniaturized and is installed easily, and a controlling method thereof.

BACKGROUND ART

An air-conditioning system for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the inside air or the outside air into the air conditioner, heating or cooling the introduced air, and blowing the heated or cooled air into the vehicle.

FIG. 1 is a schematic diagram showing an example of a conventional air-conditioning system for a vehicle. The conventional air-conditioning system for the vehicle includes: an air-conditioning case 10 which has vents 11, 12 and 13 adjusted in the degree of opening by doors 11d, 12d and 13d; a blowing part 14 connected to an inlet of the air-conditioning case 10 to blow outside air; a first evaporator E and a heater core H disposed inside the air-conditioning case 10; and a temp door 15 for adjusting the degree of opening of a cold air passageway and a warm air passageway of the air-conditioning case 10. When a cooling cycle is operated, the temp door 15 opens the cold air passageway and closes the warm air passageway. Therefore, the air blown by the blowing part 14 exchanges heat with refrigerant flowing inside the first evaporator E and is changed into cold air while passing through the first evaporator E, and then, is discharged to the interior of the vehicle through the opened vents 11, 12 and 13 so as to cool the interior of the vehicle. Moreover, when a heating cycle is operated, the temp door 15 closes the cold air passageway and opens the warm air passageway, the blown air exchanges heat with cooling water flowing inside the heater core H while passing the heater core H through the warm air passageway and is changed into warm air, and then, is discharged to the interior of the vehicle through the vents 11, 12 and 13 so as to warm the interior of the vehicle.

In this instance, in order to supply cold refrigerant to the first evaporator, as shown in FIG. 2, a compressor 1 which compresses and sends refrigerant, a condenser 2 which condenses the refrigerant of high pressure sent from the compressor 1, an expansion valve 3 for throttling the refrigerant condensed and liquefied in the condenser 2; a first evaporator E for exchanging heat between the liquefied refrigerant of low pressure throttled by the expansion valve 3 and evaporating the refrigerant to cool the air discharged to the interior of the vehicle due to heat absorption by evaporative latent heat; and refrigerant pipes 5 through which the compressor 1, the condenser 2, the expansion valve 3 and the first evaporator E are connected with one another. In the meantime, as described above, the first evaporator E is disposed inside the air-conditioning case 10, the condenser 2 is located at the front of the vehicle in order to cool the refrigerant using traveling wind, and the compressor 1 is located inside an engine room because it is operated by an engine actuating belt. Therefore, the conventional air-conditioning system has a disadvantage in that connection of the pipes 5 becomes complicated.

In the meantime, in order to cool the interior of a vehicle, such as a truck, even in a state where the engine is not operated, an anti-start air-conditioner for a vehicle operated by a battery as a power source has been proposed. Such an anti-start air-conditioner for a vehicle is illustrated in FIGS. 3 and 4. FIG. 3 is a perspective view of the anti-start air-conditioner for the vehicle, and FIG. 4 is a schematic diagram of the anti-start air-conditioner for the vehicle. The anti-start air-conditioner for the vehicle includes: first and second compressors 10a and 10b operated by the battery for the vehicle as a power source; a lying-type condenser 20 including first and second condensing parts 20a and 20b, which are respectively communicated with the first and second compressors 10a and 10b and have condenser inlets 21 to which refrigerant is induced and condenser outlets 22 through which the induced refrigerant is discharged after exchanging heat with outside air; first and second capillary tubes 30a and 30b which are respectively communicated with the condenser outlets 22 formed in the first and second condensing parts 20a and 20b; and first and second evaporators 40a and 40b which are respectively communicated with the first and second capillary tubes 30a and 30b and have first evaporator inlets 41 to which refrigerant is induced and first evaporator outlets 42 through which the induced refrigerant is discharged to the first and second compressors 10a and 10b after exchanging heat with the inside air.

However, the conventional air-conditioning system for the vehicle uses engine cooling water in order to perform heating, and the anti-start air-conditioner for the vehicle must have a heater mounted to heat the interior of the vehicle even in the state where the engine is not operated.

Therefore, an apparatus, which can perform heating and cooling at the same time, has a compact size and is easily installed in a vehicle is demanded, and especially, an apparatus which can properly perform heating and cooling even in the state where the engine is stopped or is not in use is demanded.

Patent Reference 1: Korean Patent No. 10-1251206 entitled "Anti-start air-conditioner for a vehicle"

DISCLOSURE

Accordingly, the present invention has been made in an effort to solve the above-mentioned problems occurring in the prior arts, and it is an object of the present invention to provide an air-conditioning system for a vehicle and a controlling method thereof, which can cool and heat the interior of the vehicle or properly maintain the battery, and enhance installability because the air-conditioning system can be compact-sized and can be installed at one of various positions.

In more detail, it is an object of the present invention to provide cooling and heating modules, an air-conditioning system for a vehicle and a controlling method thereof which can easily control indoor temperature of the vehicle because it is operated by a vehicle battery even though an engine is stopped, when temperature-adjusted air is supplied toward a passenger by the cooling and heating module, thereby enhancing the passenger's temperature comfort because cooling and heating modules are mounted under vehicle seats independently or to be operated in connection with an air-conditioning module.

It is another object of the present invention to provide cooling and heating modules, an air-conditioning system for a vehicle and a controlling method thereof which can maintain proper temperature of a battery to maintain performance of the battery stably when the air adjusted in temperature by the cooling and heating module is supplied to a battery side. Particularly, the present invention is to provide an air-conditioning system for a vehicle and a controlling method thereof which can maintain the battery at the optimum temperature because the battery can be preheated or cooled. Moreover, the present invention is to provide an air-conditioning system for a vehicle, which is installed adjacent to the battery to be operated separately from air-conditioning of the interior of the vehicle, and a controlling method thereof.

It is a further object of the present invention to provide an air-conditioning system for a vehicle, which includes a cooling and heating module operated by the battery in such a way as to prevent discharge of the battery, and a controlling method thereof.

To achieve the above objects, the present invention provides a cooling and heating module including: a compressor for inhaling and compressing refrigerant; a condenser for condensing the refrigerant compressed in the compressor; an expansion valve for throttling the refrigerant condensed in the condenser; a first evaporator for evaporating the refrigerant supplied through the expansion valve; a first-first blowing part for blowing air to be cooled after passing through the first evaporator; a first-second blowing part for blowing air to be heated after passing through the condenser; and a discharge duct for delivering the air, which is selectively supplied through the first-first blowing part and the first-second blowing part by opening and closing means, to a supply side. The cooling and heating module which is a single module capable of cooling and heating can be used for various purposes, such as for adjusting indoor and outdoor temperature of the vehicle, adjusting temperature of a battery, and so on.

In this instance, the cooling and heating module further includes a plate type base part on which the compressor, the condenser, the expansion valve, the first evaporator, the first-first blowing part, the first-second blowing part and the discharge duct are disposed, and the base part includes: a first mounting recess, on which the first evaporator is mounted and to which air is induced by operation of the first-first blowing part; and a second mounting recess, on which the condenser is mounted and to which air is induced by operation of the first-second blowing part.

Moreover, the discharge duct includes: an outer body; a first partition for partitioning the inside of the outer body into an upper area and a lower area; a first communication hole and a section communication hole which are hollowed to communicate the upper area with the lower area at both sides of the first partition in the length direction of the outer body; a first space part which partitions the upper area between the first communication hole and the second communication hole in the length direction of the outer body to be formed inside the partitioned part; a second partition and a third partition which form a second space part in the form of a "C" to surround the first space; a first-first inflow part and a first-second inflow part which are formed hollowed at a certain area of the outer body and connected with an outlet side of the first-first blowing part so that cooled air is induced into the first space part and the second space part partitioned by the second partition; a second-first inflow part and a second-second inflow part which are hollowed at a certain area of the outer body and connected with an outlet side of the first-second blowing part so that heated air is induced into the first space part and the second space part partitioned by the third partition; a first vent hollowed at a certain area of the outer body so that the air induced into the first space part is supplied to a supply side; and a second vent hollowed at a certain area of the outer body so that the air induced into the second space part is discharged.

Furthermore, the discharge duct of the cooling and heating module is bent at the upper side of the base part in the form of a "⌐" shaped, the compressor, the condenser, the expansion valve and the first evaporator are disposed adjacent to the bent inner face of the discharge duct, and the first vent and the second vent are formed on the outer face of the discharge duct.

In this instance, the opening and closing means opens the first-first inflow part and the second-second inflow part and closes the first-second inflow part and the second-first inflow part or closes the first-first inflow part and the second-second inflow part and opens the first-second inflow part and the second-first inflow part.

Additionally, in the cooling and heating module, the first-first inflow part and the first-second inflow part are located adjacent to each other and the second-first inflow part and the second-second inflow part are located adjacent to each other in the length direction of the discharge duct in the upper area. The opening and closing means includes: a plate part located at the upper area of the discharge duct to move in the length direction of the discharge duct; a first opening hole hollowed at a certain area of the plate part to open the first-first inflow part or the first-second inflow part; and a second opening hole hollowed at a certain area of the plate part to open the second-first inflow part or the second-second inflow part.

In addition, in the cooling and heating module, one side of the plate part of the opening and closing means gets in contact with the inner wall of the discharge duct, and the cooling and heating modules further includes a contact part extending from the first partition so that the other side of the plate part of the opening and closing means comes into contact with the contact part.

Moreover, in a cooling state, the first opening hole of the opening and closing means opens the first-first inflow part, the second opening hole opens the second-second inflow part and the plate part closes the first-second inflow part and the second-first inflow part, so that the cooled air passing through the first evaporator is delivered to the supply side through the first-first inflow part, the first space part and the first vent and the heated air passing through the condenser is discharged through the second-second inflow part, the second space part and the second vent. In a heating state, the plate part of the opening and closing means closes the first-first inflow part and the second-second inflow part, the first opening hole opens the first-second inflow part and the second opening hole opens the second-first inflow part, so that the cooled air passing through the first evaporator is discharged through the first-second inflow part, the second space part and the second vent and the heated air passing through the condenser is delivered to the supply side through the second-first inflow part, the first space part and the first vent.

Furthermore, an inlet side of the first-first blowing part is fixed to the base part to surround the first mounting recess and an outlet side of the first-first blowing part is fixed to the discharge duct to surround the first-first inflow part and the first-second inflow part, and an outlet side of the first-second blowing part is fixed to the base part to surround the second mounting recess and an outlet side is fixed to the discharge duct to surround the second-first inflow part and the second-second inflow part.

Additionally, the cooling and heating module is detachably mounted on the vehicle.

In addition, the cooling and heating module is independently controllable.

Moreover, in the cooling and heating module, the supply side is the interior of the vehicle, and may be a battery.

In another aspect of the present invention, the present invention provides an air-conditioning system for a vehicle including a cooling and heating module, a battery for operating the cooling and heating module, and a first control part.

In this instance, the air-conditioning system for the vehicle includes a plurality of the cooling and heating modules. In more detail, the cooling and heating module includes: a first cooling and heating module disposed under a first seat on which a driver sits; a second cooling and heating module disposed under a second seat which is adjacent to the first seat in the width direction of the vehicle; a third cooling and heating module disposed under a third seat which is adjacent to the first seat in the length direction of the vehicle; and a fourth cooling and heating module disposed under a fourth seat which is adjacent to the third seat in the width direction of the vehicle.

In a further aspect of the present invention, the present invention provides a method for controlling an air-conditioning system for a vehicle comprising the steps of: inputting target temperature through an input part; checking whether or not a difference between temperature measured through a temperature sensor and the target temperature inputted through the input part exceeds specific temperature; and operating a first cooling and heating module, a second cooling and heating module, a third cooling and heating module and a fourth cooling and heating module if the difference between the measured temperature and the target temperature exceeds the specific temperature in the temperature checking step.

Furthermore, in the method for controlling the air-conditioning system for the vehicle, the specific temperature is within a range of the first temperature to the $N^{th}$ temperature which increase from a lower value to a higher value, and the number of operation of the cooling and heating modules is increased as temperature increases from the first temperature to the $N^{th}$ temperature in the module operating step.

Furthermore, in the module operating step, the first cooling and heating module, the second cooling and heating module, the third cooling and heating module and the fourth cooling and heating module are operated in order.

Additionally, the method for controlling the air-conditioning system for the vehicle further includes the step of checking a charge amount of a battery, wherein the number of operation of the first to fourth cooling and heating modules is controlled according to the charge amount of the battery checked in the module operating step.

In the battery charge amount checking step, the number of operation of the first to fourth cooling and heating modules is reduced as the charge amount of the battery checked is small.

In a still further aspect of the present invention, the present invention provides an air-conditioning system for a vehicle including: an air-conditioning module including an air-conditioning case which has main vents adjusted in the degree of opening by doors, a second blowing part for blowing air to the inside of the air-conditioning case, a second evaporator and a heater core which are disposed inside the air-conditioning case, and a temp door which is mounted inside the air-conditioning case to control that the air passing through the second evaporator passes the heater core; and a cooling and heating module which forms a refrigerant cycle independently from the air-conditioning module.

Moreover, the air-conditioning system for the vehicle further includes: a second-first control part for controlling the air-conditioning module; and a second-second control part for controlling the cooling and heating module, wherein the cooling and heating module is connected with a battery to be supplied with necessary power, and the air-conditioning module and the cooling and heating module are individually controlled by the second-first control part and the second-second control part.

In this instance, the method for controlling the air-conditioning system for the vehicle includes the steps of: inputting target temperature of the interior of the vehicle by an input part; operating the air-conditioning module; first judging whether or not indoor temperature measured through a temperature sensor is within a temperature limit section; second judging whether or not a difference between the indoor temperature and the target temperature exceeds set temperature if the indoor temperature is within the temperature limit section in the first judging step; and operating the cooling and heating module if the difference between the indoor temperature and the target temperature exceeds the set temperature in the second judging step.

Furthermore, the method for controlling the air-conditioning system for the vehicle further includes the step of checking a charge amount of the battery.

In the meantime, in another aspect of the present invention, the present invention provides an air-conditioning system for a vehicle including: a battery case accommodating a battery therein; a cooling and heating module; a temperature sensor for measuring temperature of the battery; and a third control part for comparing actual temperature measured through the temperature sensor with favorable temperature of the battery and controlling operation of the cooling and heating module.

In this instance, the third control part controls the heated air passing through the condenser to be supplied through the second-first inflow part, the first space part and the first vent and controls the cooled air passing through the first evaporator to be discharged to the outside of the vehicle through the first-second inflow part, the second space part and the second vent when the actual temperature is less than the minimum favorable temperature. Moreover, the third control part controls the cooled air passing through the first evaporator to be supplied through the first-first inflow part, the first space part and the first vent and controls the heated air passing through the condenser to be discharged to the outside of the vehicle through the second-first inflow part, the second space part and the second vent when the actual temperature exceeds the maximum favorable temperature.

Additionally, the cooling and heating module is directly connected to the battery case to supply air to the inside of the battery case through the first vent of the discharge duct.

As described above, the air-conditioning system for the vehicle and the controlling method thereof can cool and heat the interior of the vehicle or properly maintain the battery, and enhance installability because the air-conditioning system can be compact-sized and can be installed at one of various positions.

In more detail, the air-conditioning system for the vehicle and the controlling method thereof can easily control indoor temperature of the vehicle because it is operated by a vehicle battery even though an engine is stopped, when temperature-adjusted air is supplied toward a passenger by the cooling and heating module. Therefore, the present invention can enhance the passenger's temperature comfort because cooling and heating modules are mounted under vehicle seats independently or to be operated in connection with an air-conditioning module.

Furthermore, the air-conditioning system for the vehicle and the controlling method thereof can maintain proper temperature of a battery to maintain performance of the battery stably when the air adjusted in temperature by the cooling and heating module is supplied to a battery side. Particularly, the air-conditioning system for the vehicle and the controlling method thereof can maintain the battery at the optimum temperature because the battery can be preheated or cooled, and the air-conditioning system can be installed adjacent to the battery to be operated separately from air-conditioning of the interior of the vehicle.

In addition, according to the air-conditioning system for the vehicle and the controlling method thereof, the cooling and heating module is operated by the battery in such a way as to prevent discharge of the battery.

DESCRIPTION OF DRAWINGS

FIG. 18 is a view showing the method for controlling the air-conditioning system illustrated in FIGS. 16 and 17.

FIG. 20 is a view showing the method for controlling the air-conditioning system illustrated in FIG. 19.

Figure 1:
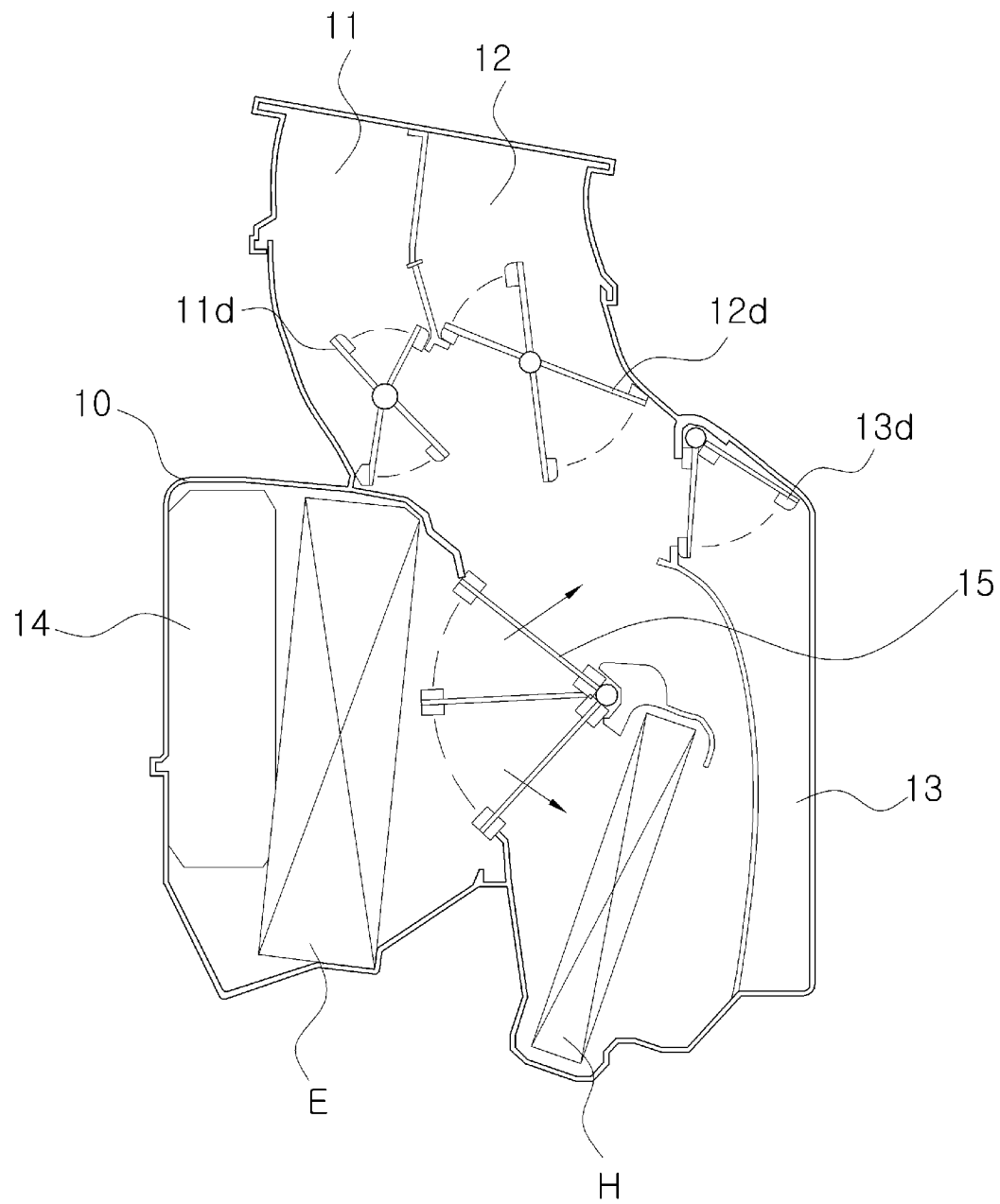
FIG. 1 is a schematic diagram showing a conventional air-conditioning system for a vehicle.
Figure 2:
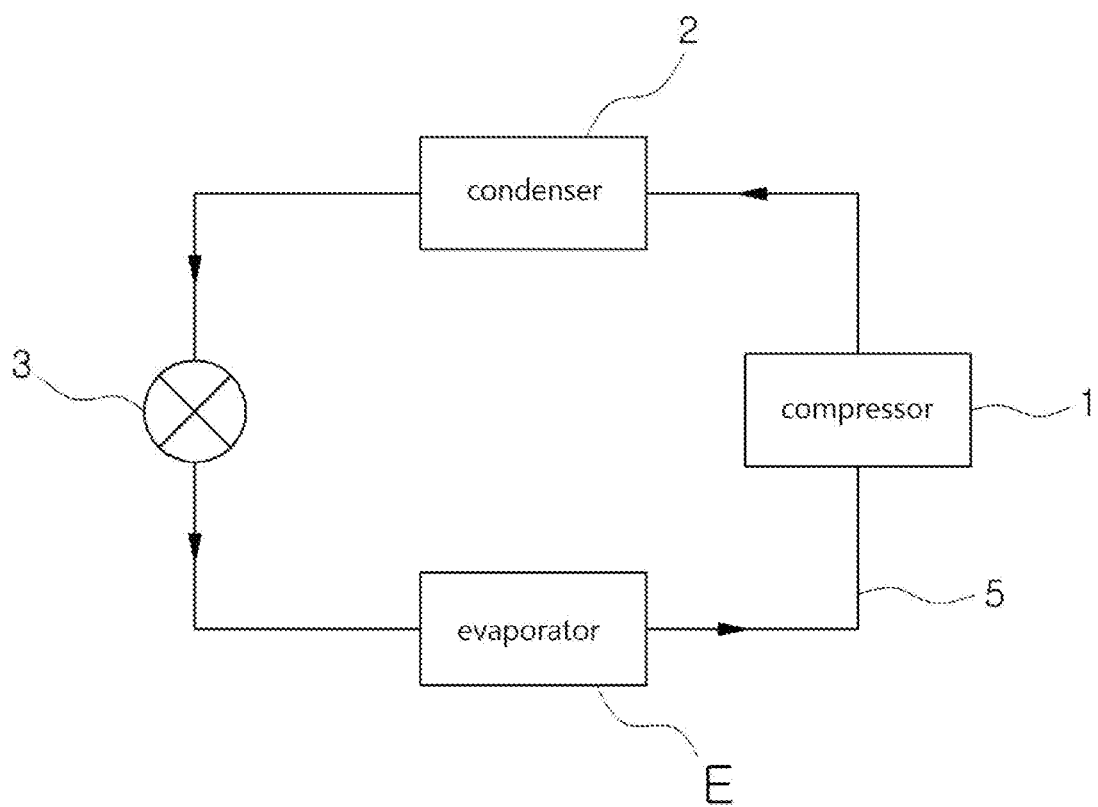
FIG. 2 is a schematic diagram showing a conventional air-conditioner cooling system.
Figure 3:
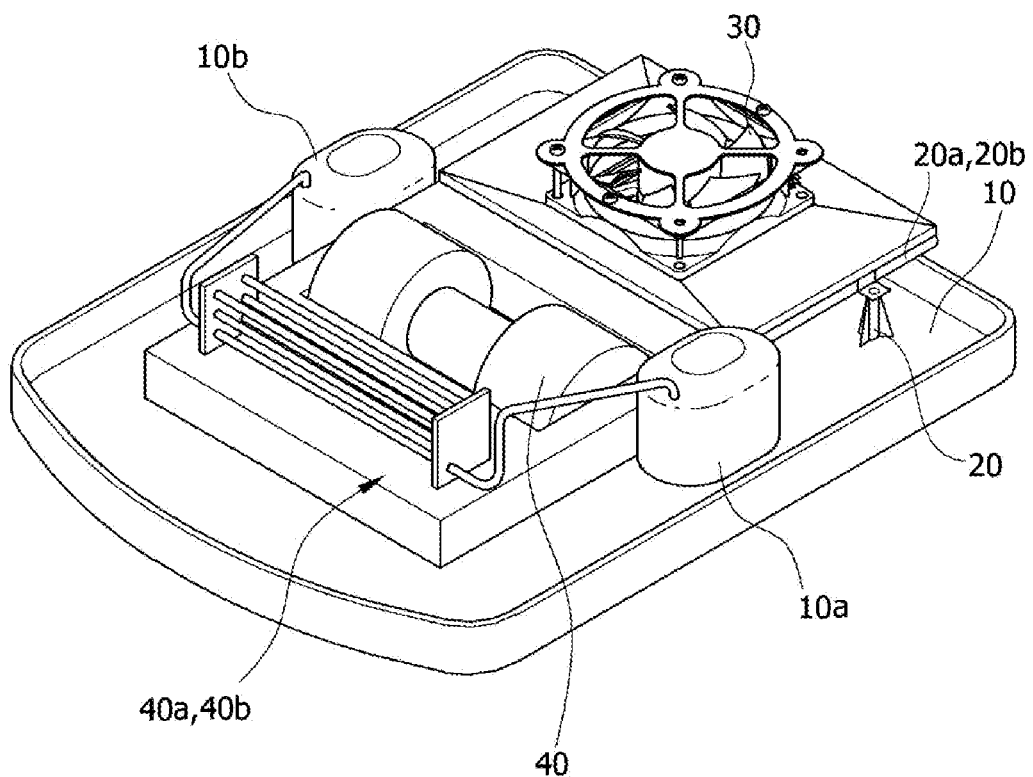
FIG. 3 is a perspective view and FIG. 4 is a schematic diagram of an anti-start air-conditioner for a vehicle.
Figure 4:
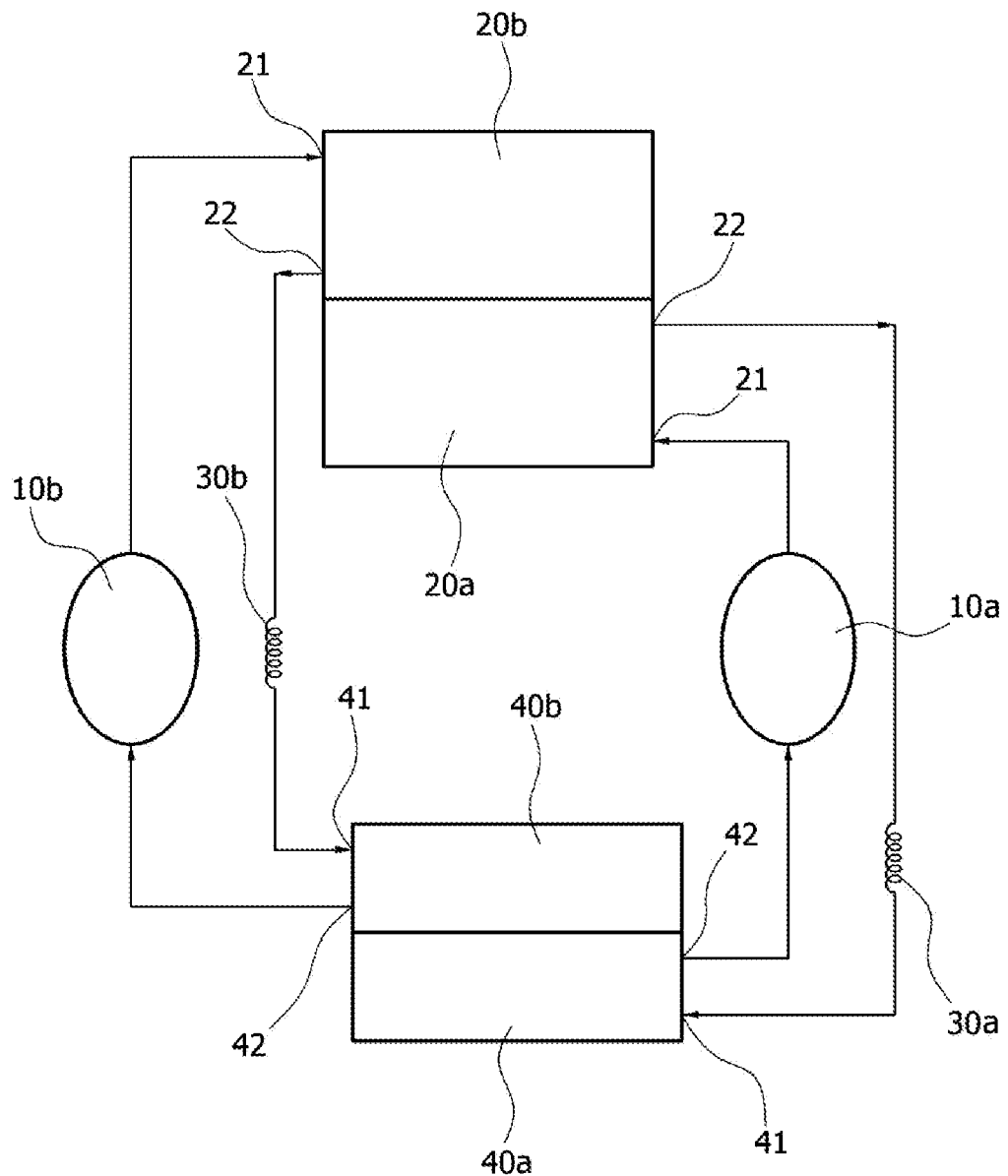

* Explanation of numeral numbers in drawings

D1: cooling and heating module
(D1-1: first cooling and heating module,
D1-2: second cooling and heating module,
D1-3: third cooling and heating module and
D1-4: fourth cooling and heating module)
100: compressor
200: condenser
300: expansion valve
400: first evaporator
500: first-first blowing part
600: first-second blowing part
700: discharge duct, 710: outer body
711: first space part, 712: second space part
720: first partition, 721: first communication hole
722: second communication hole
730: second partition
740: third partition
751: first-first inflow part,
752: first-second inflow part
753: second-first inflow part, 754: second-second inflow part
760: first vent,
770: second vent
780: contact part
800: opening and closing means
810: plate part, 820: first opening hole
830: second opening hole
900: base part, 910: first mounting recess
920: second mounting recess
D2: air-conditioning module
1100: air-conditioning case
1101, 1102, 1103: vent
1101d, 1102d, 1103d: door
1200: second blowing part
1300: second evaporator
1400: heater core
1500: temp door
2100: first controlling part
2210: second-first controlling part
2220: second-second controlling part
2300: third controlling part
B: battery, C: battery case
I: input part
T: temperature sensor -continued

* Explanation of numeral numbers in drawings

A1: air-conditioning system for vehicle
A2: air-conditioning system for vehicle (for battery)
S1: first seat
S2: second seat
S3: third seat
S4: fourth seat

DETAILED DESCRIPTION

Hereinafter, reference will be now made in detail to air-conditioning systems A1 and A2 for vehicles according to preferred embodiments of the present invention with reference to the attached drawings.

The air-conditioning system A1 for a vehicle according to the present invention includes a cooling and heating module, and first, the cooling and heating module D1 according to the present invention will be described.

Figure 5:
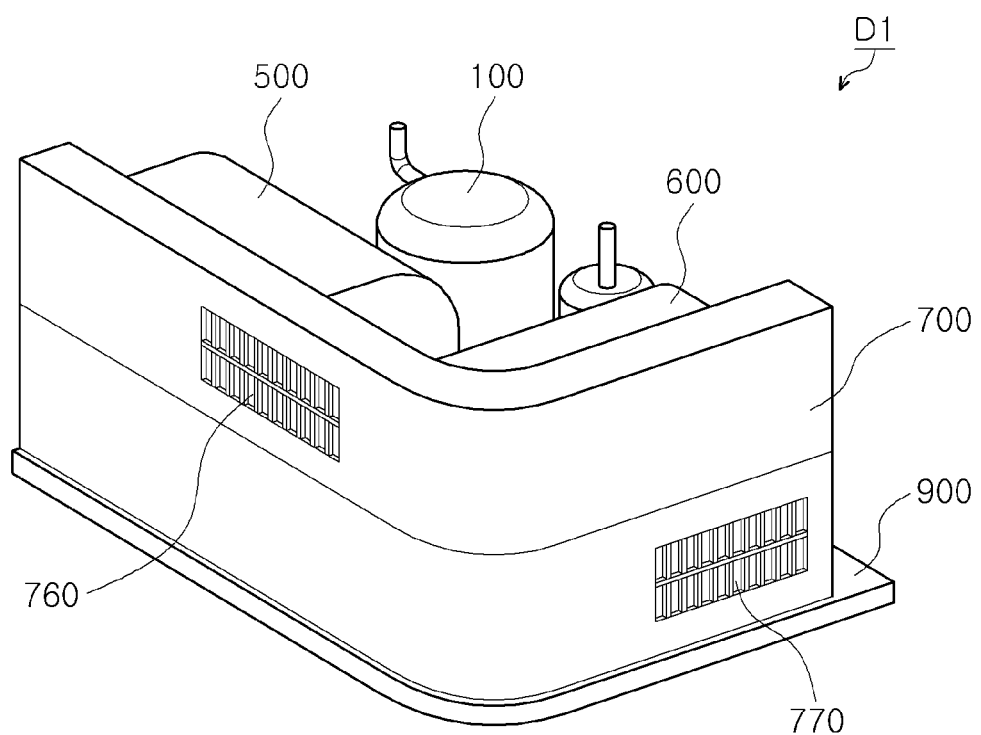
FIG. 5 is a perspective view.
Figure 6:
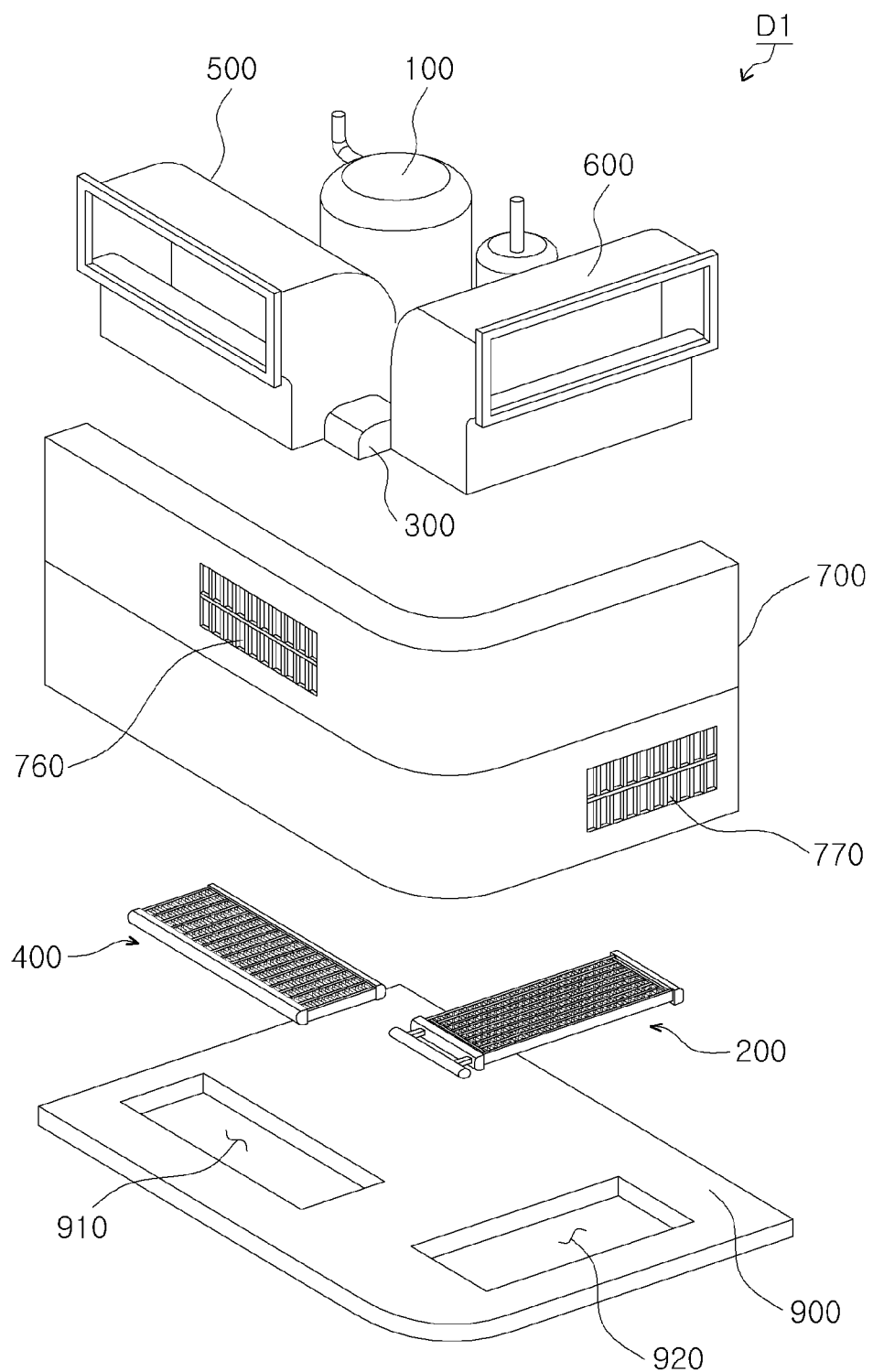
FIG. 6 is an exploded perspective view and FIG. 7 is a sectional perspective view showing a cooling and heating module according to an embodiment of the present invention.
Figure 7:
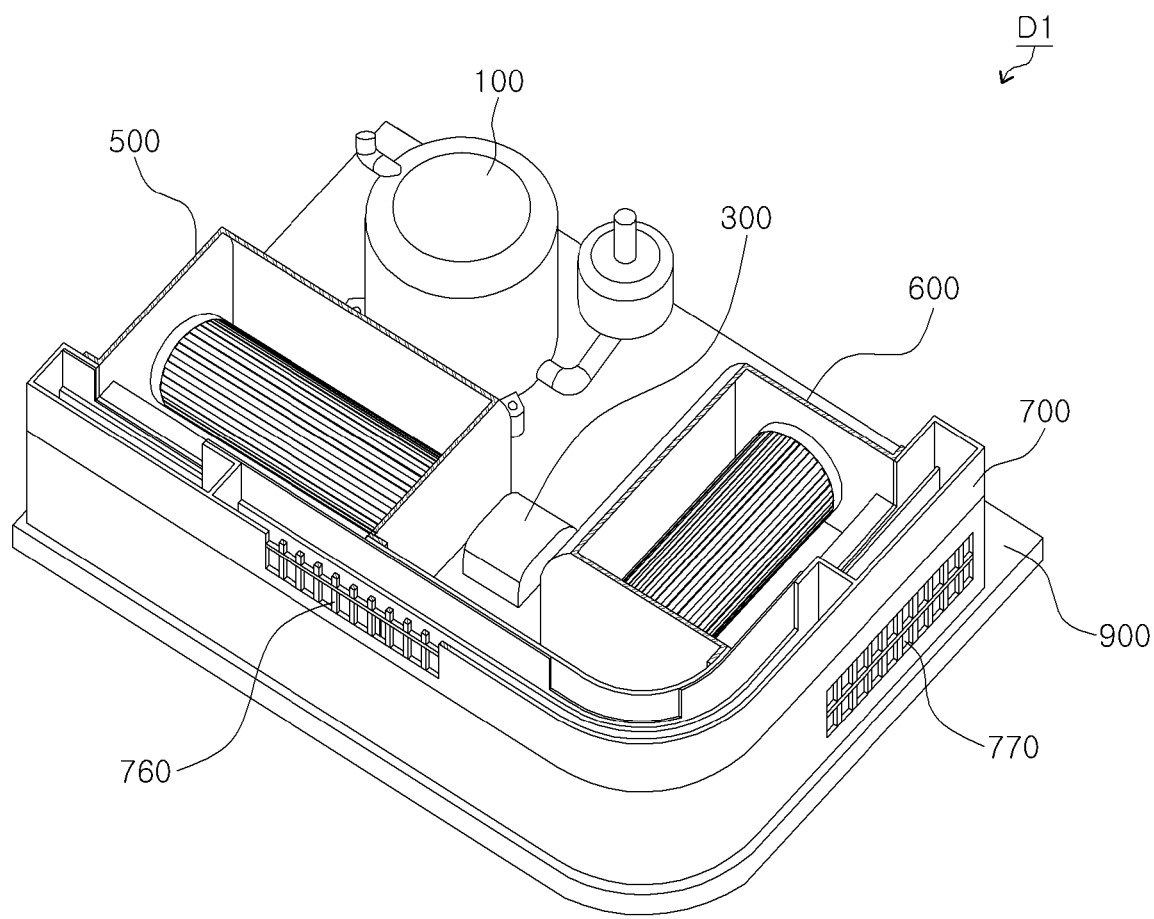
Figure 8:
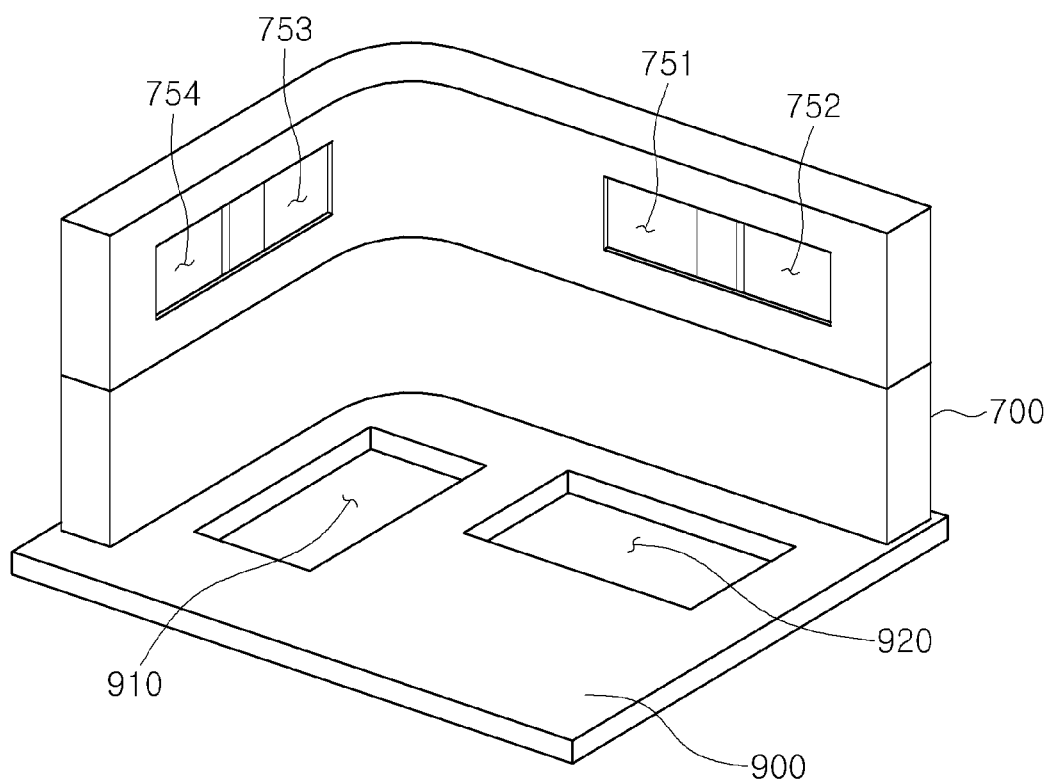
FIG. 8 is a partially perspective view of the cooling and heating module according to the present invention.
Figure 9:
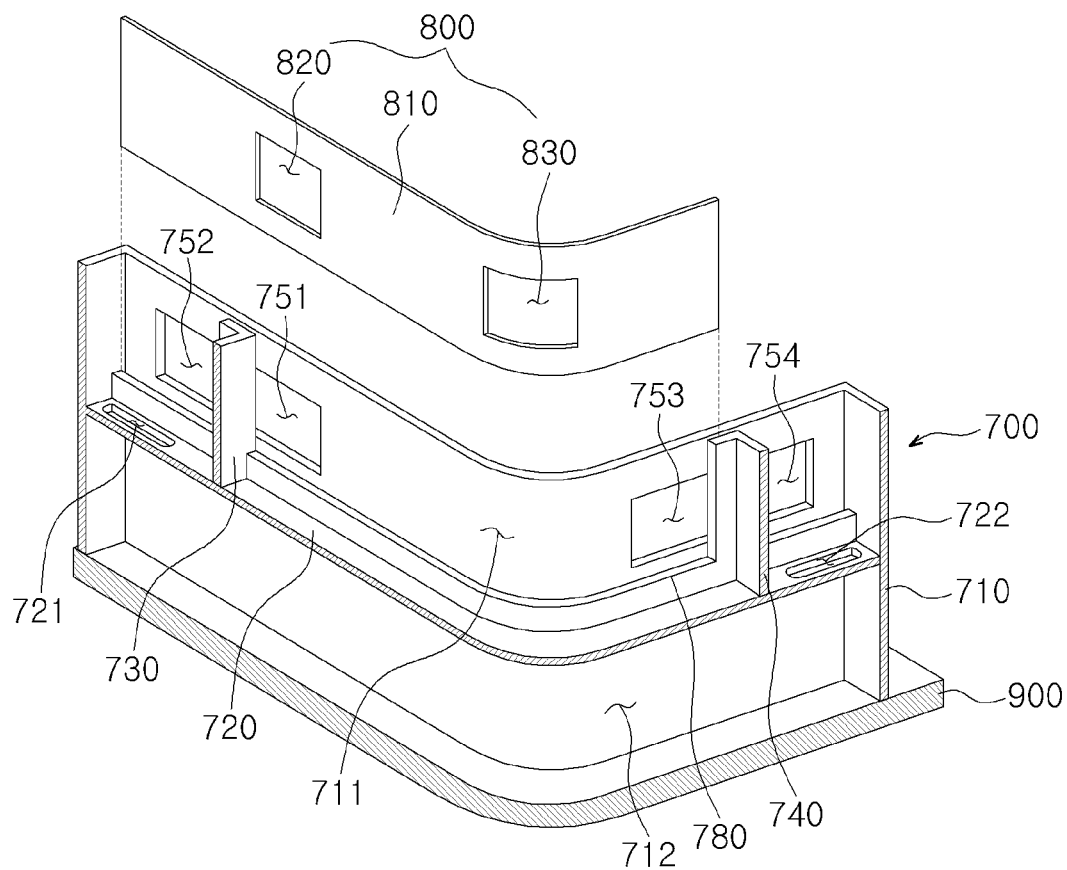
FIG. 9 is an exploded perspective view, in section, of the cooling and heating module according to the present invention.

FIG. 5 is a perspective view, FIG. 6 is an exploded perspective view and FIG. 7 is a sectional perspective view showing a cooling and heating module D1 according to an embodiment of the present invention, FIG. 8 is a partially perspective view of a discharge duct 700 and a base part 900 of the cooling and heating module D1 according to the present invention, and FIG. 9 is an exploded perspective view, in section, of the cooling and heating module D1 according to the present invention.

The cooling and heating module D1 includes a compressor 100, a condenser 200, an expansion valve 300, a first evaporator 400, a first-first blowing part 500, a first-second blowing part 600 and a discharge duct 700.

The compressor 100 is to inhale and compress gas-phase refrigerant, and supplies the gas-phase refrigerant of high-temperature and high-pressure to the condenser 200. In this instance, preferably, the compressor 100 is operated by receiving a driving force by a battery B so that the cooling and heating module D1 can be operated even in a state where the vehicle is stopped.

The condenser 200 condenses the gas-phase refrigerant into liquid of high-temperature and high-pressure by exchanging heat between the gas-phase refrigerant of high-temperature and high-pressure discharged from the compressor 100 and outside air, and then, discharges the liquid of high-temperature and high-pressure to the expansion valve 300. In this instance, the condenser 200 acts as a heating source for heating air passing through the condenser 200 when the refrigerant is condensed. In FIG. 6, the condenser 200 includes a pair of header tanks, tubes of which both ends are fixed to the header tanks, a fin interposed between the tubes, and a gas-liquid separator for separating liquid-phase refrigerant from gas-phase refrigerant so as to supply just the liquid-phase refrigerant to the expansion valve 300. However, the condenser 200 may have one of other various forms.

The expansion valve 300 rapidly expands the liquid-phase refrigerant of high-temperature and high-pressure discharged from the condenser 200 by a throttling action to make it into a wet saturated state of low-temperature and low-pressure, and discharges it to the first evaporator 400.

The first evaporator 400 exchanges heat between outside air and the liquid-phase refrigerant of low-pressure throttled in the expansion valve 300 to vaporize the refrigerant, and then, discharges it to the compressor 100. In this instance, the condenser 200 acts as a cooling source to cool the air passing through the first evaporator 400 when the refrigerant is vaporized. In FIG. 6, the first evaporator 400 includes a pair of header tanks, tubes of which both ends are fixed to the header tanks, and a fin interposed between the tubes.

In other words, the refrigerant circulates the compressor 100, the condenser 200, the expansion valve 300 and the evaporator 400 in order, and the compressor 100, the condenser 200, the expansion valve 300 and the evaporator 400 are connected with one another through pipes (not shown), but the pipes for connecting them with one another are not illustrated in FIGS. 5 to 13.

The first-first blowing part 500 is means for blowing air so that the air is cooled after passing through the first evaporator 400, and the first-second blowing part 600 is means for blowing air so that the air is heated after passing through the condenser 200.

The discharge duct 700 is a part to deliver the cooled air supplied through the first-first blowing part 500 and the heated air supplied through the first-second blowing part 600, and in this instance, the cooled air supplied through the first-first blowing part 500 or the heated air supplied through the first-second blowing part 600 is selectively delivered toward a supply side by the opening and closing means 800. The discharge duct 700 may be formed in one of various forms, and a detailed form of the discharge duct 700 will be described later. In the present invention, the "supply side" means the side that the air adjusted in temperature through the cooling and heating module D1 is supplied, and the definition of the supply side may be changed according to purposes of the cooling and heating module D1. For instance, if the cooling and heating module D1 according to the present invention is used to adjust temperature for a passenger, the "supply side" may be changed into a "passenger side" for air-conditioning the interior of the vehicle. Furthermore, if the cooling and heating module D1 is used to adjust temperature of the battery, the "supply side" may be interpreted as a "battery side". Additionally, unused air, namely, heated air during cooling or cooled air during heating, is discharged to the outside.

Therefore, the cooling and heating module D1 is the one module for cooling and heating the whole cycle where refrigerant circulates, is compact-sized, and can easily adjust temperature of the interior of the vehicle.

Moreover, the cooling and heating module D1 may further include a base part 900. The base part 900 is formed in a plate type, and the compressor 100, the condenser 200, the expansion valve 300, the first evaporator 400, the first-first blowing part 500, the first-second blowing part 600 and the discharge duct 700 of the cooling and heating module D1 are mounted on the base part 900. The base part 900 includes: a first mounting recess 910 on which the first evaporator 400 is mounted and which is hollowed so that air is induced by operation of the first-first blowing part 500; and a second mounting recess 920 on which the condenser 200 is mounted and which is hollowed so that air is induced by operation of the first-second blowing part 600. The first mounting recess 910 and the second mounting recess 920 must have the size to make the first evaporator 400 and the condenser 200 mounted on the base part 900 and make the air induced. In this instance, in order to make the air exchange heat easily, namely, in order to cool in case of the evaporator 400 and heat in case of the condenser 200, the first mounting recess 910 is formed to be over the size corresponding to a core part of the first evaporator 400 where the tubes and the fins are formed, and the second mounting recess 920 is formed to be over the size corresponding the a core part of the condenser 200 where the tubes and fins are formed. The cooling and heating module D1 according to the present invention can be compact-sized and can be freely installed anywhere inside the vehicle.

In this instance, the first-first blowing part 500 is fixed to the base part 900 in such a way that an inlet side of the first-first blowing part 500 surrounds the first mounting recess 910, and is fixed to the discharge duct 700 in such a way that an outlet side surrounds the first-first inflow part 751 and the first-second inflow part 752. The first-second blowing part 600 is fixed to the base part 900 in such a way that an inlet side surrounds the second mounting recess 920, and is fixed to the discharge duct 700 in such a way that an outlet side surrounds the second-first inflow part 753 and the second-second inflow part 754. In FIG. 7, the first-first blowing part 500 and the first-second blowing part 600 are formed in a cross flow fan type, but may be formed in any one of various types if they can induce air from the first mounting recess 910 or the second mounting recess 920 and supply the induced air to the discharge duct 700.

The air cooled after passing through the first evaporator 400 and the air heated after passing through the condenser 200 are induced into the discharge duct 700, and the discharge duct 700 selectively discharges the cooled air or the heated air to the supply side by operation of the opening and closing means 800. The discharge duct 700 includes an outer body 710, a first partition 720, a first communication hole 721, a second communication hole 722, a second partition 730, a third partition 740, the first-first inflow part 751, the first-second inflow part 752, the second-first inflow part 753, the second-second inflow part 754, a first vent 760 and a second vent 770.

The outer body 710 forms the outer appearance of the discharge duct 700.

The first partition 720 divides the inside of the outer body 710 into an upper area and a lower area.

The first communication hole 721 and the second communication hole 722 are formed in the length direction of the outer body 710 to communicate the upper area and the lower area at both sides of the first partition 720.

The second partition 730 and the third partition 740 are formed between the first communication hole 721 and the second communication hole 722 to partition the upper area in the length direction of the outer body 710, and are vertically formed on the first partition 720. Accordingly, a first space part 711 is formed in an inner space formed by the outer body 710, the first partition 720, the second partition 730 and the third partition 740, and a second space part 712 is in the form of a "C" to surround the first space 711. That is, the second space part 712 means the lower area and the zone of the upper area where the first communication hole 721 and the second communication hole 722 are formed in the length direction of the outer body 710.

The first-first inflow part 751 and the first-second inflow part 752 are hollowed at a certain area of the outer body 710 and are connected with the outlet side of the first-first blowing part 500 so that the cooled air is induced into the first space part 711 and the second space part 712 partitioned by the second partition 730. The second-first inflow part 753 and the second-second 754 are hollowed at a certain area of the outer body 710 and are connected with the outlet side of the first-second blowing part 600 so that heated air is induced into the first space part 711 and the second space part 712 partitioned by the third partition 740. That is, the first-first inflow part 751 is a part that the air cooled by passing through the first evaporator 400 by operation of the first-first blowing part 500 is induced into the first space part 711, and the first-second inflow part 752 is a part that the air cooled by passing through the first evaporator 400 by operation of the first-first blowing part 500 is induced into the second space part 712. Furthermore, the second-first inflow part 753 is a part that the air heated by passing through the condenser 200 by operation of the first-second blowing part 600 is induced into the first space part 711, and the second-second inflow part 754 is a part that the air heated by passing through the condenser 200 by operation of the first-second blowing part 600 is induced into the second space part 712. In this instance, the first-first inflow part 751 and the first-second inflow part 752 may be formed individually to adjoin each other or may be formed in one hollow partitioned by the second partition 730 inside the outer body 710. Additionally, the second-first inflow part 753 and the second-second inflow part 754 may be formed individually to adjoin each other or may be formed in one hollow partitioned by the third partition 740 inside the outer body 710. FIG. 8 illustrates the first-first inflow part 751 and the first-second inflow part 752 which are in one hollow form and the second-first inflow part 753 and the second-second inflow part 754 which are in one hollow form.

The first vent 760 is the part that the certain area where the first space part 711 of the outer body 710 is hollowed so that the air induced into the first space part 711 is supplied to the supply side, and the second vent 770 is the part that the certain area where the second space part 712 of the outer body 710 is hollowed so that the air induced into the second space part 712 is discharged. In this instance, the second vent 770 is connected with the outside of the vehicle so that the air induced into the second space 712 is discharged to the outside of the vehicle.

In other words, through the discharge duct 700, the cooled air passing through the first evaporator 400 or the heated air passing through the condenser 200 is induced into the first space part 711 and is delivered to the supply side through the first vent 760, and the remaining air is induced into the second space part 712 and is discharged out through the second vent 770.

The opening and closing means 800 is means for controlling a flow of inside air of the discharge duct 700, and opens the first-first inflow part 751 and the second-second inflow part 754 and closes the first-second inflow part 752 and the second-first inflow part 753 (cooling mode), or closes the first-first inflow part 751 and the second-second inflow part 754 and opens the first-second inflow part 752 and the second-first inflow part 753 (heating mode). In more detail, the opening and closing means 800 includes a plate part 810, a first opening hole 820 and a second opening hole 830.

The plate part 810 is located at the upper area of the discharge duct 700 and moves in the length direction of the discharge duct 700 in a plate form which can close the first-first inflow part 751, the first-second inflow part 752, the second-first inflow part 753 and the second-second inflow part 754. In this instance, the plate part 810 includes: the first opening hole 820 formed at a certain area of the plate part 810 to open the first-first inflow part 751 or the first-second inflow part 752; and the second opening hole 830 formed at a certain area of the plate part 810 to open the second-first inflow part 753 or the second-second inflow part 754. That is, one side of the plate part 810 of the opening and closing means 800 gets in contact with an inner wall of the outer body 710 of the discharge duct 700 to adjust opening degrees of the first-first inflow part 751, the first-second inflow part 752, the second-first inflow part 753 and the second-second inflow part 754.

In this instance, the cooling and heating module D1 according to the embodiment of the present invention further includes a contact part 780 formed inside the discharge duct 700 to support the other side of the plate part 810 of the opening and closing means 800, namely, the side opposed to the side of the plate part 810 getting in contact with the inner wall of the outer body 710. Of course, the contact part 780 must have the size not to prevent air from being induced through the first-first inflow part 751, the first-second inflow part 752, the second-first inflow part 753 and the second-second inflow part 754.

In this instance, the discharge duct 700, namely, the outer body 710, may be disposed on the plate-type base part 900 and is bent in the form of a "L" shape to be compact-sized. That is, as shown in FIGS. 5 to 13, the discharge duct 700 may be disposed on one side of the base part 900 along two neighboring sides of the base part 900. In this instance, the compressor 100, the condenser 200, the expansion valve and the first evaporator 400 are disposed adjacent to the bent inner face of the discharge duct 700, and the first vent 760 and the second vent 770 are formed on the outer face of the discharge duct 700.

Figure 10:
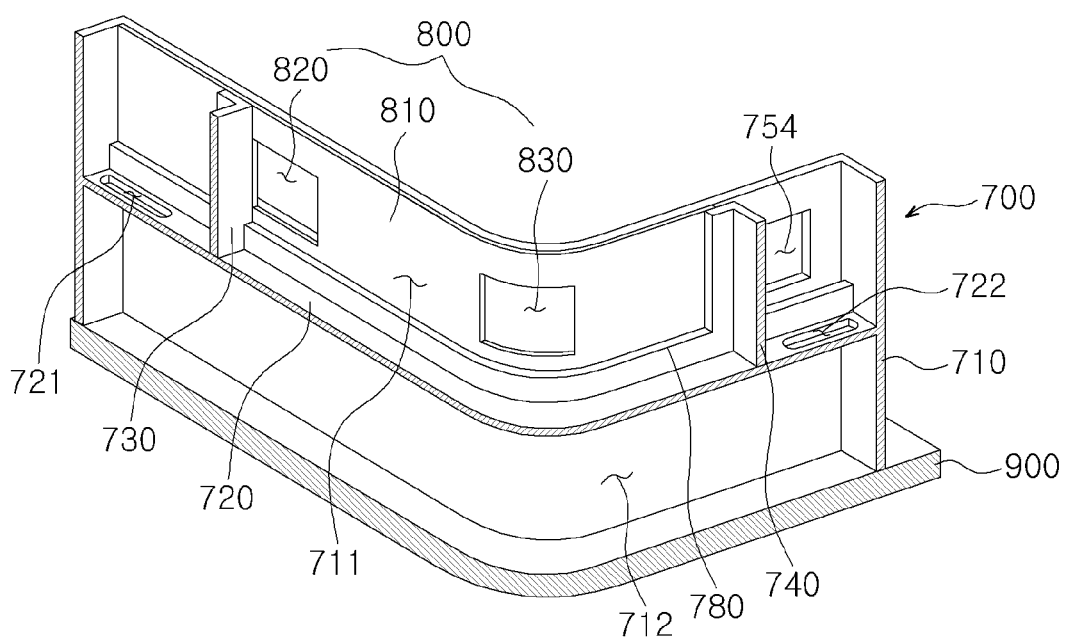
FIGS. 10 and 11 are views showing a cooling state of the cooling and heating module according to the present invention.
Figure 11:
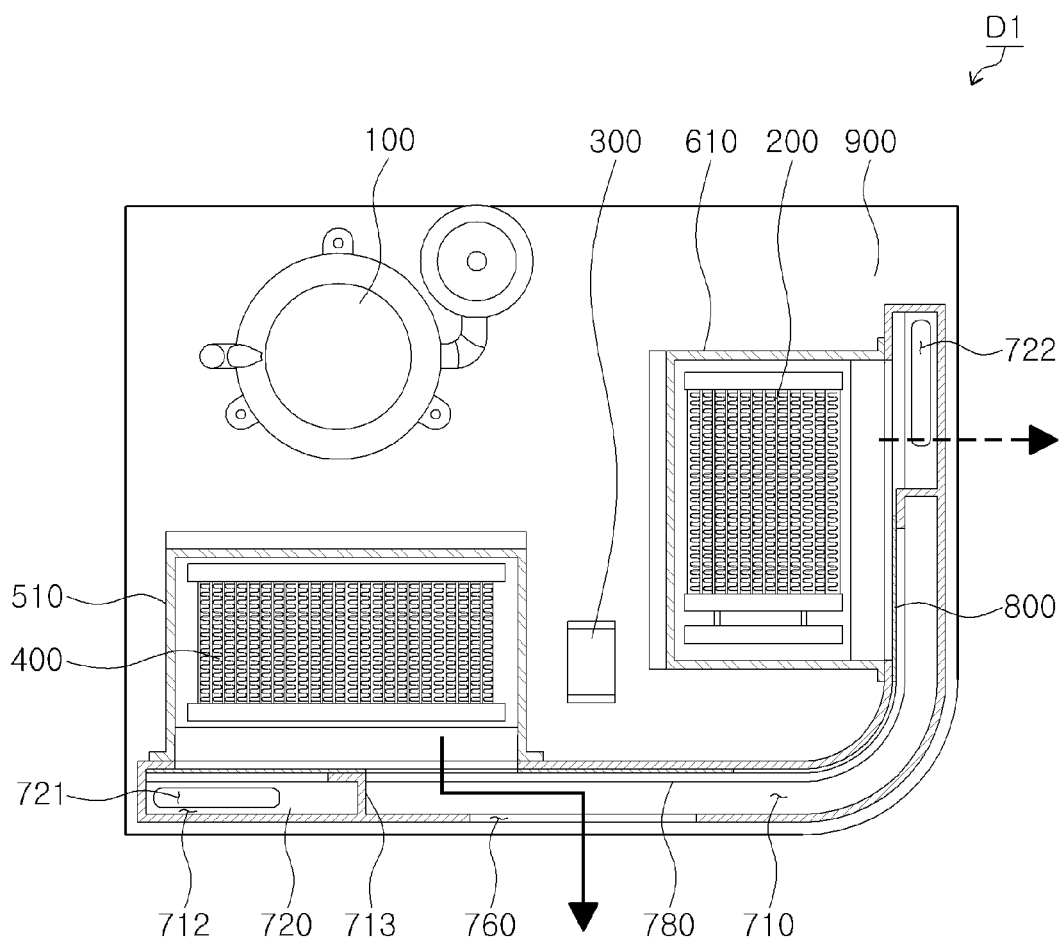
Figure 12:
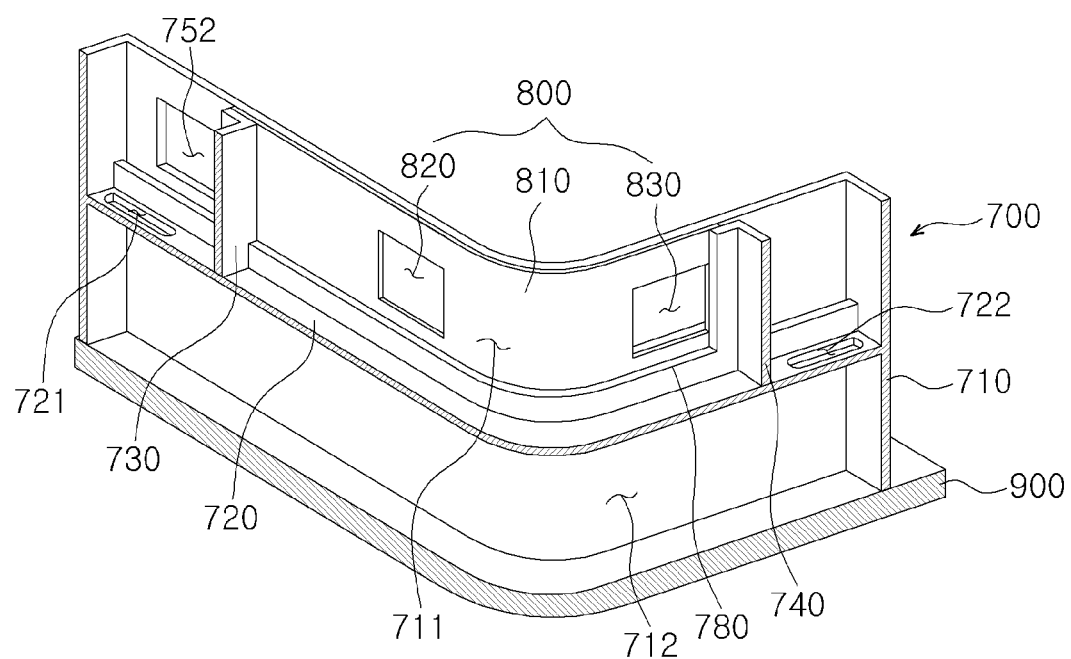
FIGS. 12 and 13 are views showing a heating state of the cooling and heating module according to the present invention.
Figure 13:
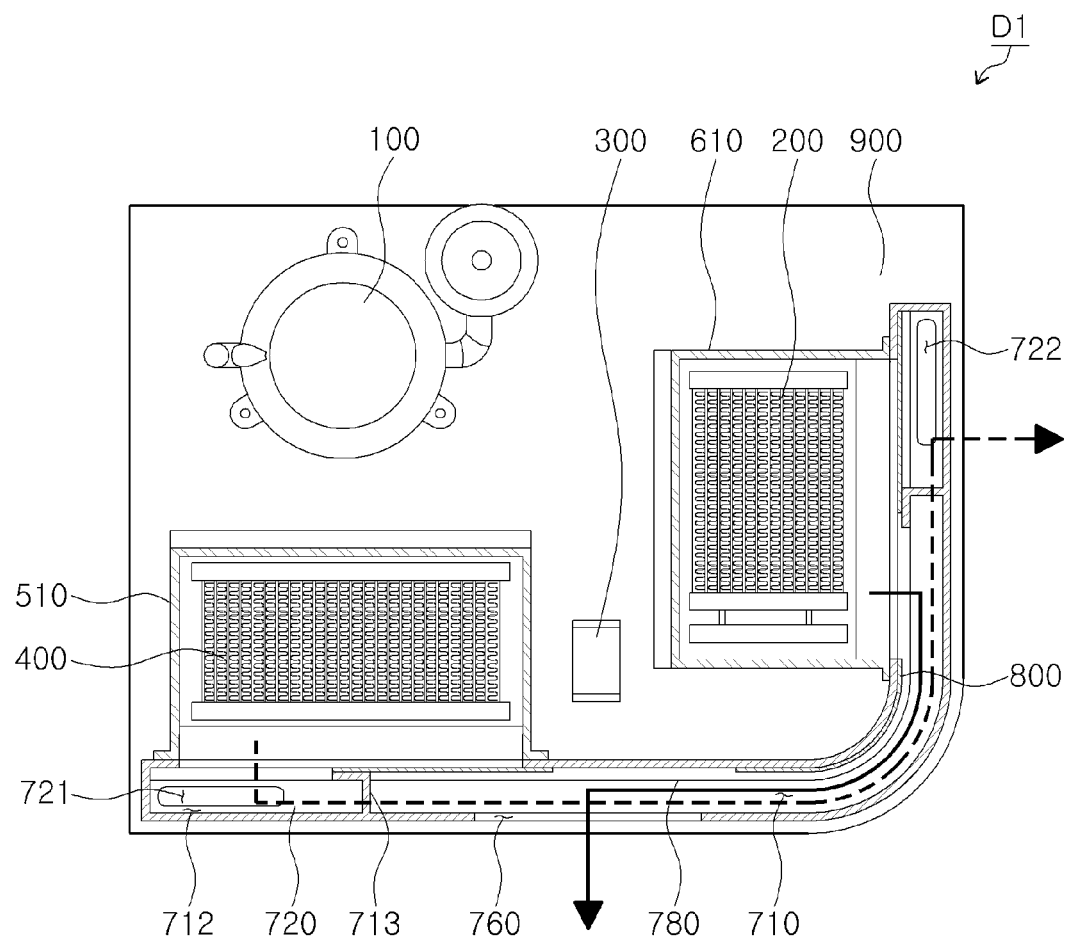

FIGS. 10 and 11 are views showing a cooling state of the cooling and heating module D1 according to the present invention, and FIGS. 12 and 13 are views showing a heating state of the cooling and heating module D1 according to the present invention. FIGS. 11 and 13 illustrate a cross section of the part of the discharge duct 700 where the first vent 760 of the upper area is formed, and for your understanding, inner configurations of the first-first blowing part 500 and the first-second blowing part 600. As shown in FIGS. 10 and 11, in the cooling state of the cooling and heating module D1 according to the present invention, the first opening hole 820 of the opening and closing means 800 opens the first-first inflow part 751, the second opening hole 830 opens the second-second inflow part 754 and the plate part 810 closes the first-second inflow part 752 and the second-first inflow part 753, so that the cooled air passing through the first evaporator 400 is delivered to the supply side through the first-first inflow part 751, the first space part 711 and the first vent 760, and the heated air passing through the condenser 200 is discharged to the outside of the vehicle through the second-second inflow part 754, the second space part 712, and the second vent 770. Moreover, as shown in FIGS. 12 and 13, in the heating state, the plate part 810 of the opening and closing means 800 closes the first-first inflow part 751 and the second-second inflow part 754, the first opening hole 820 opens the first-second inflow part 752 and the second opening hole 830 opens the second-first inflow part 753, so that the cooled air passing through the first evaporator 400 is discharged to the outside of the vehicle through the first-second inflow part 752, the second space part 712 and the second vent 770, and the heated air passing through the condenser 200 is delivered to the supply side through the second-first inflow part 753, the first space part 711 and the first vent 760.

Particularly, because the passenger can detachably mount the cooling and heating module D1 onto the vehicle, if it is necessary to adjust temperature from the outside of the vehicle, the passenger can detach the cooling and heating module D1 and use it outside the vehicle. In this instance, in the present invention, the meaning of the "passenger side" may be interpreted as a "user side" who uses the cooling and heating module D1 when the cooling and heating module D1 is used outside the vehicle, and the direction of the cooling and heating module D1 is the direction that air is discharged through the first vent 760. In case of an outdoor activity, if it is necessary to perform air-conditioning outside the vehicle, the cooling and heating module D1 may be operated by a battery B of the vehicle or by external power. Furthermore, the cooling and heating module D1 may be installed at one of various places where it can be detachably mounted inside the vehicle, for instance, at a glove box, a console box, a space between the rear seat and the rear window, and on the floor of the vehicle. Namely, the cooling and heating module D1 may be mounted at any place with no restriction in mounting place if it can be detachably mounted. The cooling and heating module D1 may be controlled by a main control system of the vehicle or may be controlled independently. That is, the cooling and heating module D1 may be operated independently from the main control system which control indoor air-conditioning of the vehicle when it performs indoor air-conditioning of the vehicle or when it is used outside the vehicle.

Figure 14:
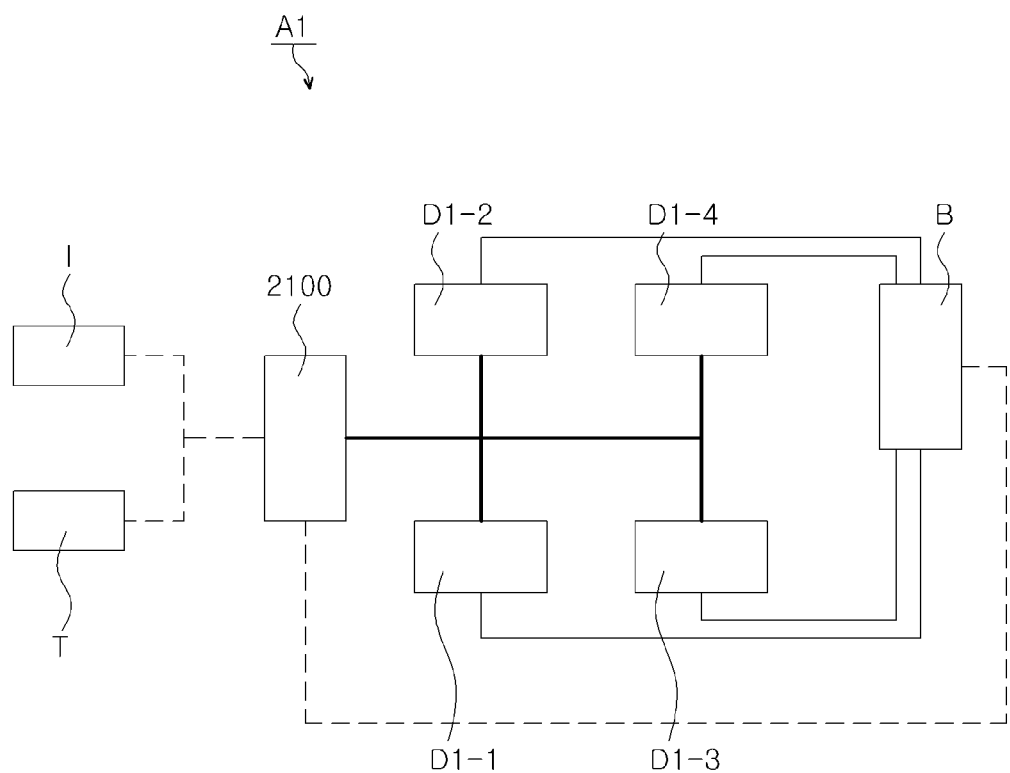
FIG. 14 is a schematic diagram showing an air-conditioning system for a vehicle according to an embodiment of the present invention.
Figure 15:
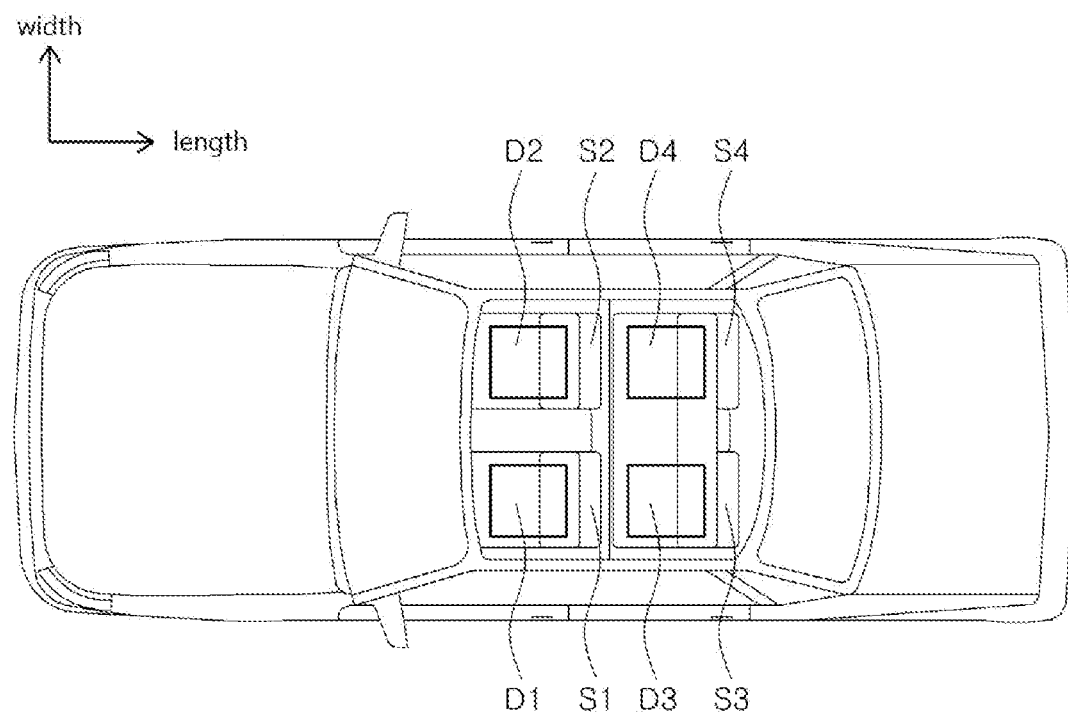
FIG. 15 is a schematic diagram showing an arrangement of the cooling and heating module of the air-conditioning system for the vehicle according to the present invention.

Hereinafter, an example that the cooling and heating module D1 performs indoor air-conditioning of the vehicle will be described. FIG. 14 is a schematic diagram showing an air-conditioning system A1 for a vehicle according to an embodiment of the present invention, and FIG. 15 is a schematic diagram showing an arrangement of the cooling and heating module D1 of the air-conditioning system A1 for the vehicle according to the present invention. The air-conditioning system A1 for the vehicle according to the present invention includes the cooling and heating module D1 and the battery B.

The cooling and heating module D1 has the above-mentioned characteristics, and the air-conditioning system A1 according to the present invention includes a plurality of the cooling and heating modules D1. Particularly, the cooling and heating modules D1 are respectively disposed under vehicle seats to directly supply cooled air or heated air toward passengers inside the vehicle. FIG. 15 illustrates total four cooling and heating modules D1: a first cooling and heating module D1-1 disposed under a first seat S1 on which a driver sits; a second cooling and heating module D1-2 disposed under a second seat S2 which is adjacent to the first seat S1 in the width direction of the vehicle; a third cooling and heating module D1-3 disposed under a third seat S3 which is adjacent to the first seat S1 in the length direction of the vehicle; and a fourth cooling and heating module D1-4 disposed under a fourth seat S4 which is adjacent to the third seat S3 in the width direction of the vehicle.

The battery B is to operate the cooling and heating modules D1 and is a driving source of the compressor 100 and the opening and closing means 800.

In this instance, a first control part 2100 controls the plural cooling and heating modules D1. The first control part 2100 controls operation of the cooling and heating modules D1 in consideration of the user's input by an input part 1 and vehicle conditions, such as temperature measured through a temperature sensor T, a charge amount of the battery B and so on.

Figure 16:
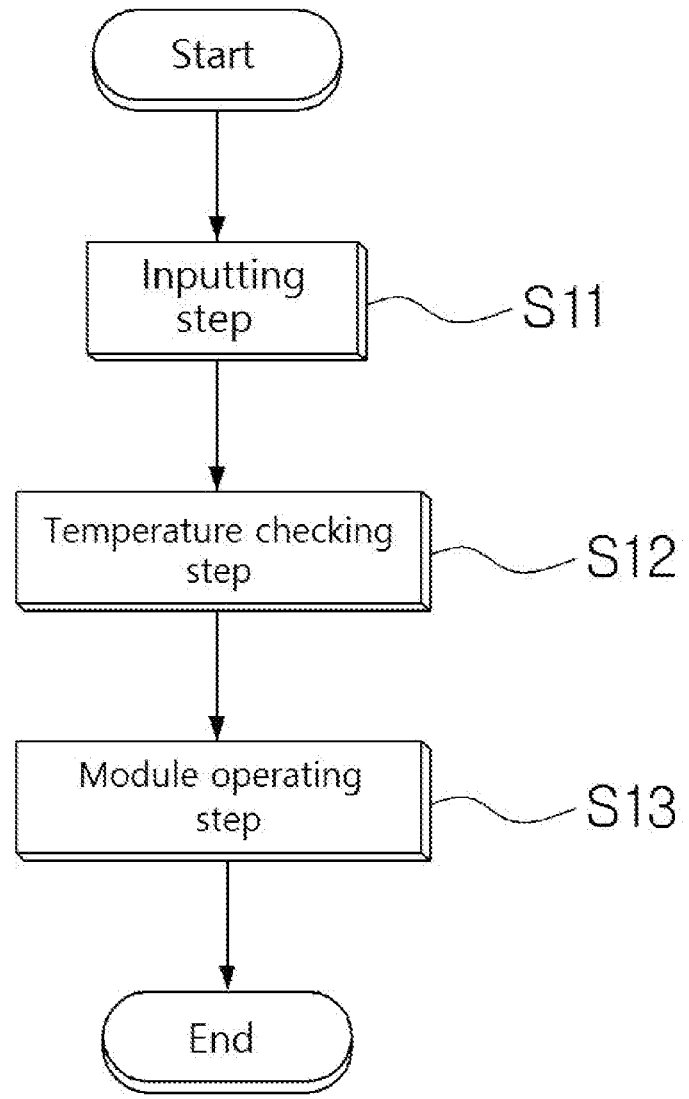
FIGS. 16 and 17 are flow charts of a method for controlling the air-conditioning system for the vehicle according to an embodiment of the present invention.
Figure 17:
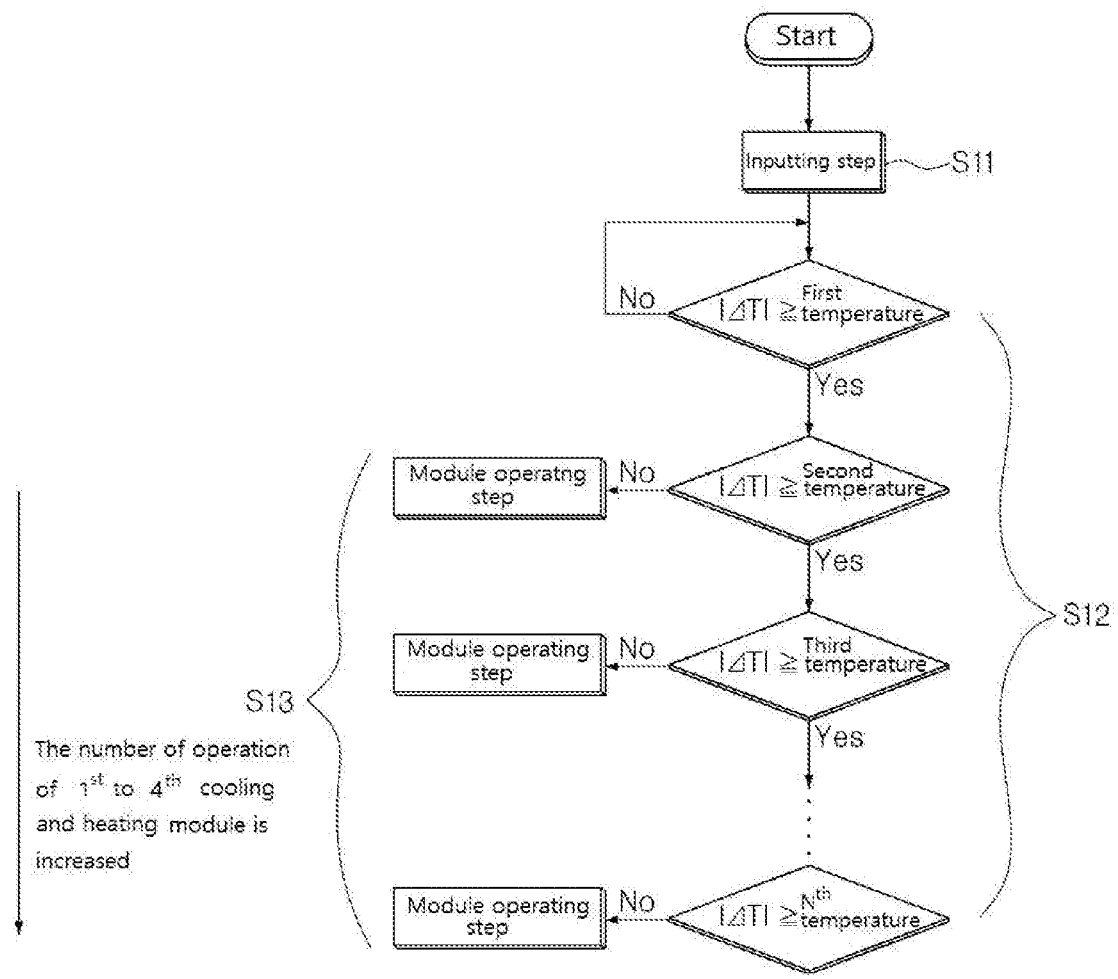

In the meantime, FIGS. 16 and 17 are flow charts of a method for controlling the air-conditioning system for the vehicle according to an embodiment of the present invention, and FIG. 18 is a view showing the method for controlling the air-conditioning system illustrated in FIGS. 16 and 17. The method for controlling the air-conditioning system A1 for the vehicle according to the present invention includes an inputting step S11, a temperature checking step S12 and a module operating step S13.

The inputting step S11 is the step of inputting target temperature through the input part I.

The temperature checking step S12 is the step of checking whether or not a difference between temperature measured through the temperature sensor T and the target temperature inputted through the input part I exceeds a specific temperature.

The module operating step S13 is the step of operating the first cooling and heating module D1-1 to the fourth cooling and heating module D1-4 when the difference between temperature measured through the temperature sensor T and the target temperature inputted through the input part I exceeds the specific temperature. In this instance, because there are a plurality of the cooling and heating modules D1, the specific temperature is in the range of first temperature to $N^{th}$ temperature which increase from a lower value to a higher value. In the module operating step S13, as temperature increases from the first temperature to the $N^{th}$ temperature, the number of operation of the cooling and heating modules D1 is increased. In other words, the method for controlling the air-conditioning system A1 for the vehicle according to the present invention can rapidly and effectively adjust temperature inside the vehicle because the number of the operating cooling and heating modules D1 is increased when the difference between measured and the target temperature gets larger. Additionally, in the module operating step S13, the first cooling and heating module D1-1, the second cooling and heating module D1-2, the third cooling and heating module D1-3 and the fourth cooling and heating module D1-4 are operated in order. For instance, if the first control part 2100 judges that it is necessary to operate one of the cooling and heating modules D1, the first cooling and heating module D1-1 is operated. If the first control part 2100 judges that it is necessary to operate two of the cooling and heating modules D1, the first cooling and heating module D1-1 and the second cooling and heating module D1-2 are operated. If the first control part 2100 judges that it is necessary to operate three of the cooling and heating modules D1, the first cooling and heating module D1-1, the second cooling and heating module D1-2 and the third cooling and heating module D1-3 are operated. If the first control part 2100 judges that it is necessary to operate all of the cooling and heating modules D1, the first cooling and heating module D1-1, the second cooling and heating module D1-2, the third cooling and heating module D1-3 and the fourth cooling and heating module D1-4 are operated (See FIG. 18). In this instance, the specific temperature ranging from the first temperature to the $N^{th}$ temperature is a specifically preset value.

Figure 19:
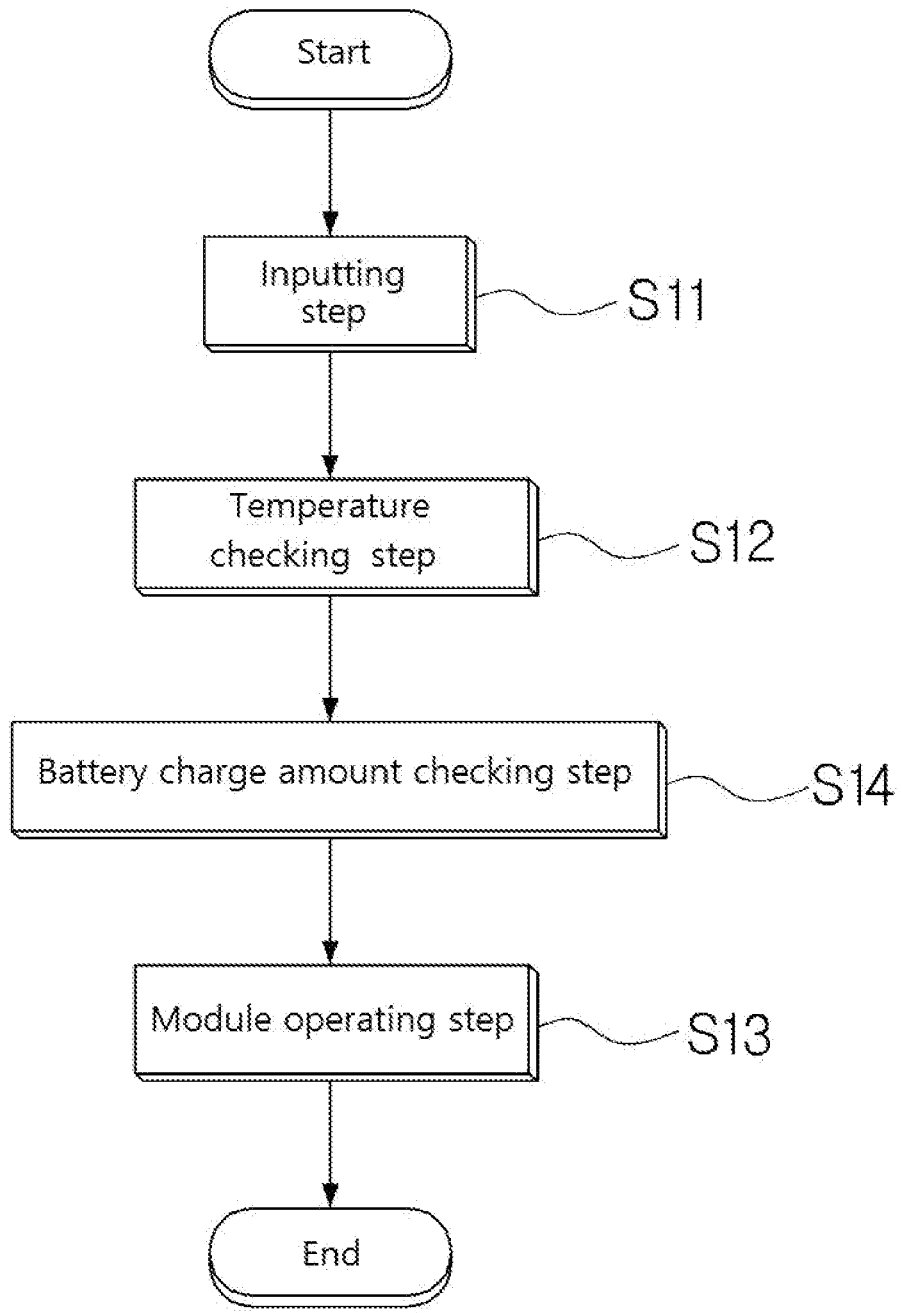
FIG. 19 is a flow chart of a method for controlling the air-conditioning system for the vehicle according to another embodiment of the present invention.

FIG. 19 is a flow chart of a method for controlling the air-conditioning system A1 for the vehicle according to another embodiment of the present invention, and FIG. 20 is a view showing the method for controlling the air-conditioning system A1 illustrated in FIG. 19. The method for controlling the air-conditioning system A1 for the vehicle according to the present invention further includes a battery charge amount checking step S14.

The battery charge amount checking step S14 is the step of checking a charge amount of the battery B. In the module operating step S13, the number of operation of the cooling and heating modules D1 is controlled according to the charge amount of the battery B checked in the battery charge amount checking step S14.

In this instance, the air-conditioning system A1 reduces the number of operation of the cooling and heating modules D1 as the charge amount of the battery B checked in the battery charge amount checking step S14 is low.

That is, as shown in FIG. 20, the method for controlling the air-conditioning system A1 for the vehicle determines the number of operation of the cooling and heating modules D1 according to temperature, but prevents electric discharge of the battery B by controlling the number of operation of the cooling and heating modules D1 when the charge amount of the battery B is low. In FIG. 20, the first charge amount to the fourth charge amount are specifically preset values. FIG. 20 illustrates an example, and operation of the cooling and heating modules D1 can be controlled in various ways.

In other words, FIGS. 16 to 20 illustrate various methods for controlling the air-conditioning system A1 illustrated in FIGS. 16 to 20 having the four cooling and heating modules D1 illustrated in FIGS. 14 and 15 in case that all of the cooling and heating modules D1 perform inside air-conditioning of the vehicle.

Figure 21:
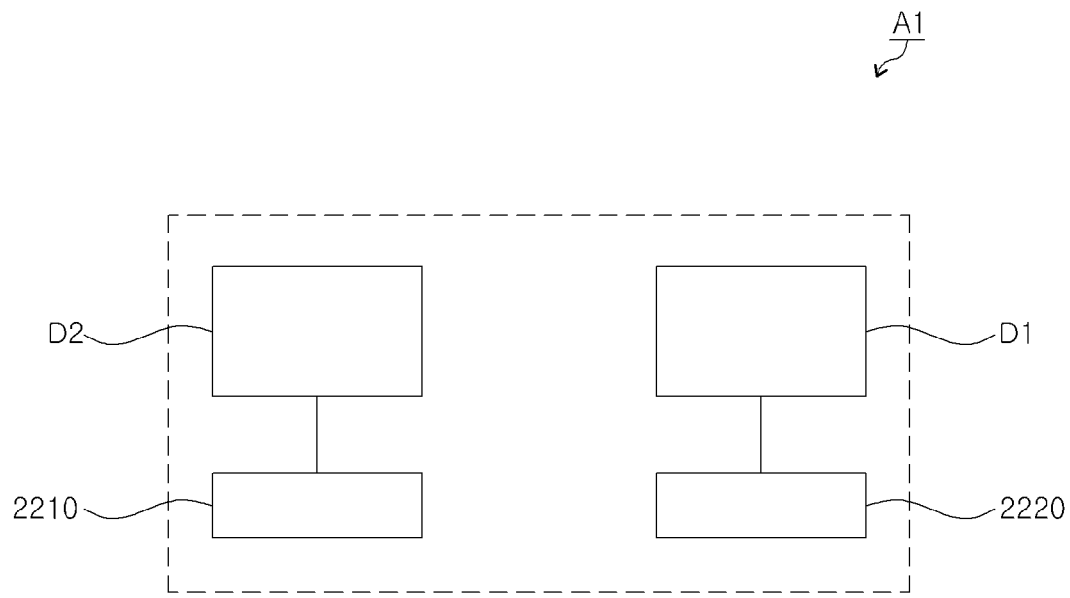
FIG. 21 is a schematic diagram and FIG. 22 is an explanatory diagram of an air-conditioning system for a vehicle according to another embodiment of the present invention.
Figure 22:
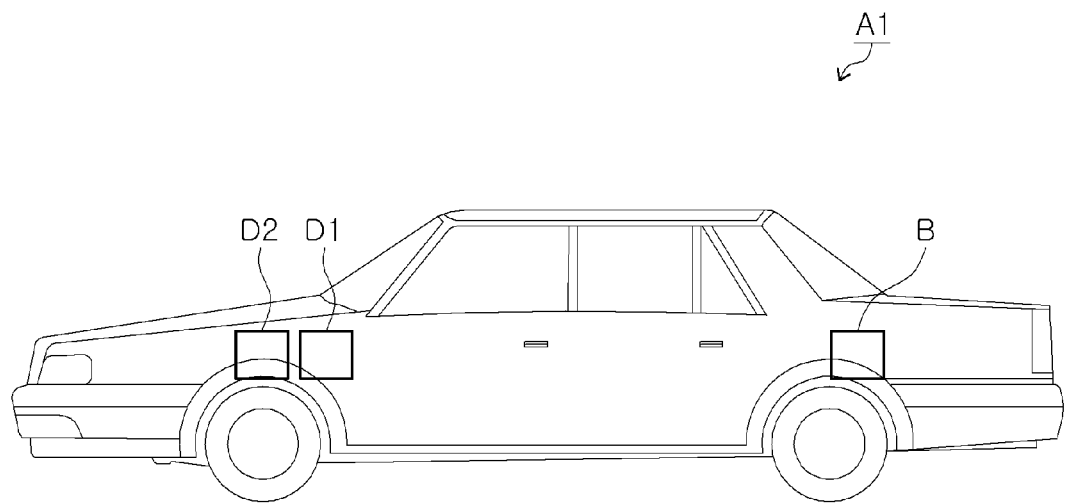

Hereinafter, a case that the air-conditioning system A1 performs inside air-conditioning of the vehicle using the cooling and heating modules D1 and an air-conditioning module D2 will be described. FIG. 21 is a schematic diagram and FIG. 22 is an explanatory diagram of an air-conditioning system for a vehicle according to another embodiment of the present invention.

The air-conditioning system A1 in this embodiment includes the air-conditioning module D2 and the cooling and heating module D1. In FIG. 22, the air-conditioning module D2 and the cooling and heating module D1 are disposed at the front side of the vehicle, but the cooling and heating module D1 which is operated by the battery B may be located in various ways, for instance, under the vehicle seat or near to the battery B.

Figure 23:
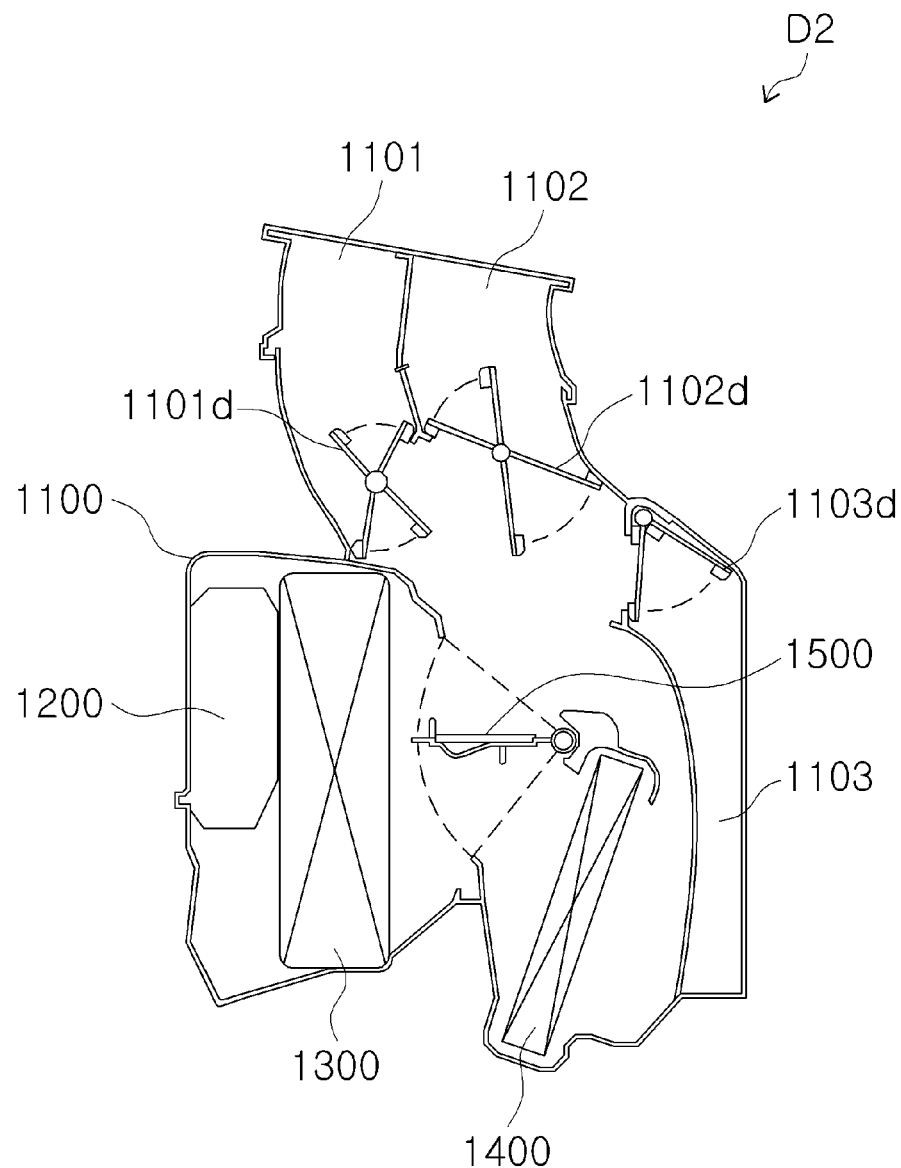
FIG. 23 is a schematic diagram showing an air-conditioning module according to an embodiment of the present invention.

FIG. 23 is a schematic diagram showing the air-conditioning module D2 according to an embodiment of the present invention. Now, the air-conditioning module D2 of the air-conditioning system A1 for the vehicle according to the present invention will be described. The air-conditioning module D2 includes an air-conditioning case 1100, a second blowing part 1200, a second evaporator 1300, a heater core 1400 and a temp door 1500.

The air-conditioning case 1100 has main vents 1101, 1102 and 1103 which are controlled in the degree of opening by doors 1101d, 1102d and 1103d, and deliver air toward the passenger inside the vehicle when the air is blown from the second blowing part 1200. In this instance, the main vents 1101, 1102 and 1103 are a face vent 1101, a defrost vent 1102 and a floor vent 1103. The face vent 1101 is to discharge air toward the front seat of the vehicle, the defrost vent 1102 is to discharge air toward the window of the vehicle, and the floor vent 1103 is to discharge air toward the front seat floor of the vehicle. The face vent 1101, the defrost vent 1102 and the floor vent 1103 are respectively controlled in the degree of opening through the doors 1101d, 1102d and 1103d.

The second evaporator 1300 is disposed inside the air-conditioning case 1100 to cool the air.

The heater core 1400 is disposed inside the air-conditioning case 1100 and is mounted at the rear side of the second evaporator 130 in the air flow direction in order to heat air.

The temp door 1500 is mounted inside the air-conditioning case 110 to control that the air passing through the second evaporator 1300 passes the heater core 1400, and is adjusted according to the target temperature set by the passenger.

The cooling and heating module D1 is operated individually from the air-conditioning module D2 and is mounted to perform inside air-conditioning of the vehicle together with the air-conditioning module D2. The air-conditioning system A1 includes a second-first control part 2210 for controlling the air-conditioning module D2 and a second-second control part 2220 for controlling the cooling and heating module D1. The cooling and heating module D1 is connected with the battery B to receive necessary power, and the air-conditioning module D2 and the cooling and heating module D1 are controlled individually by the second-first control part 2210 and the second-second control part 2220.

Description of the cooling and heating module D1 will be omitted because it is described above.

The air-conditioning system A1 for the vehicle illustrated in FIGS. 21 and 22 includes the air-conditioning module D2 and the cooling and heating module D1, and uses the cooling and heating module D1 which is an independent device in which refrigerant circulates. In other words, the cooling and heating module D1 is not connected with a pipe for supplying refrigerant to the second evaporator 1300 of the air-conditioning module D2, and can be mounted in any place of the interior of the vehicle. Especially, compared with the conventional air-conditioning system which has the rear evaporator, the air-conditioning system A1 for the vehicle according to the present invention can enhance assemblability because it does not need a part for delivering refrigerant, reduce a refrigerant charge amount and reduce manufacturing costs. Moreover, because the cooling and heating module D1 is operated independently from the air-conditioning module D2, the air-conditioning system A1 according to the present invention can properly maintain indoor temperature of the vehicle since one of the modules D1 and D2 does not have any influence on the other module even though one of the modules D1 and D2 is out of order.

Figure 24:
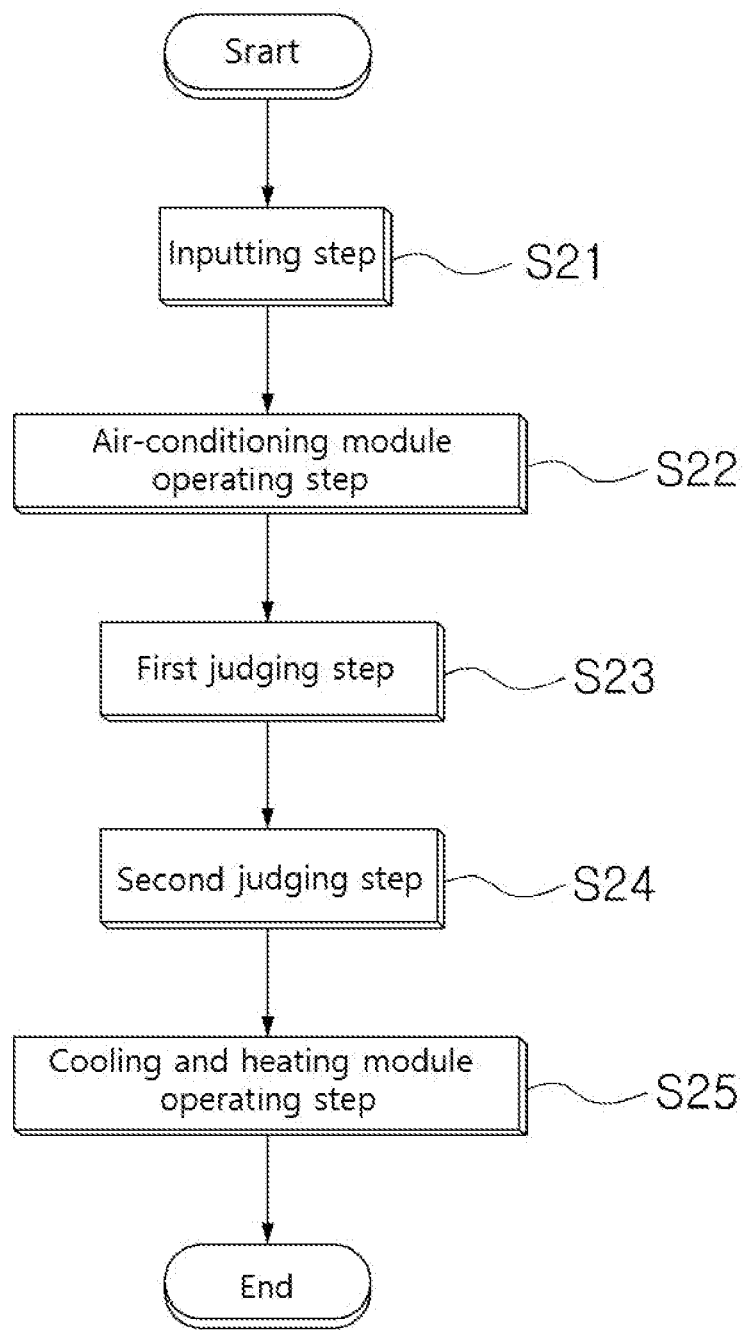
FIGS. 24 and 25 are views showing a method for controlling the air-conditioning system for the vehicle according to an embodiment of the present invention.
Figure 25:
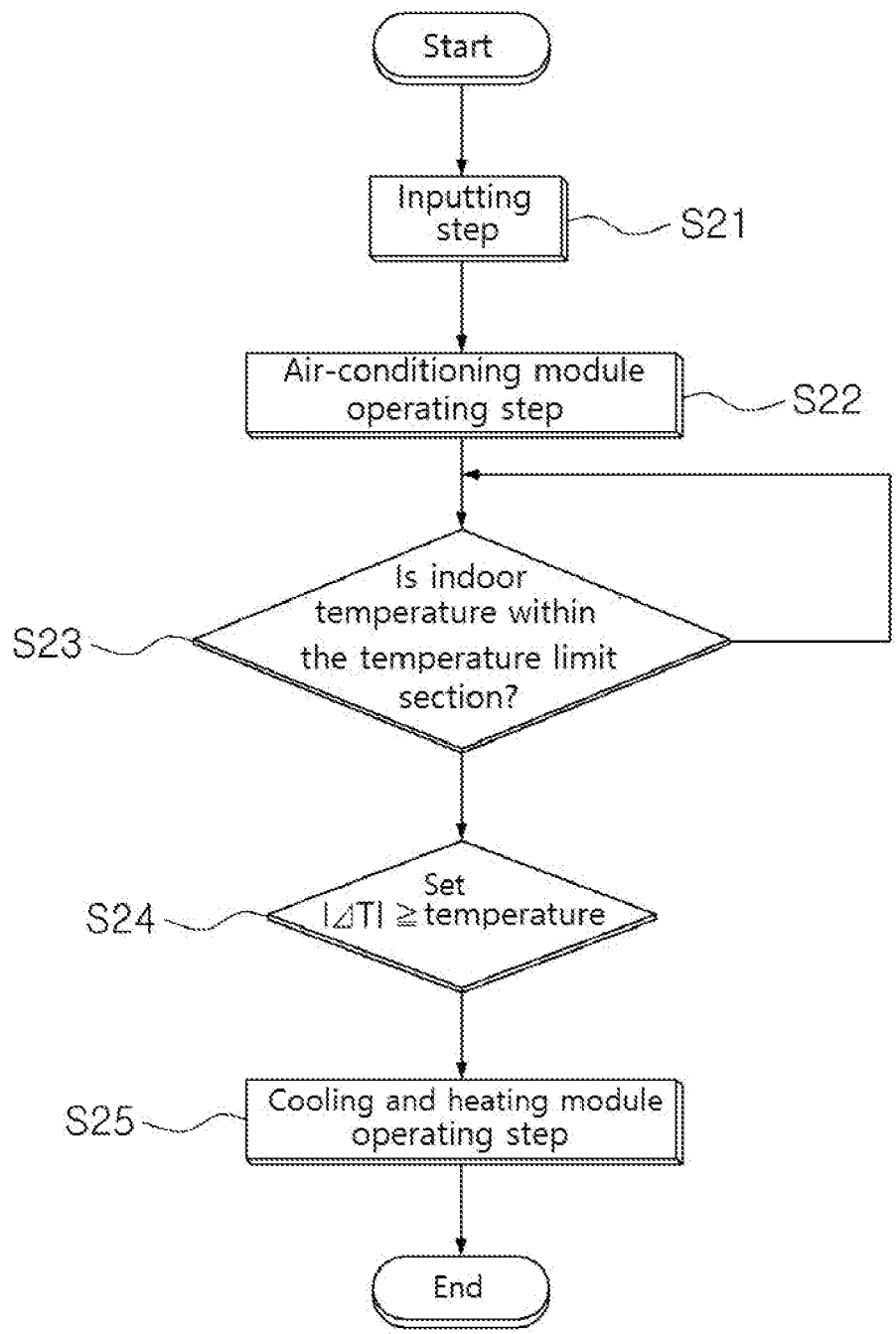

FIGS. 24 and 25 are views showing the method for controlling the air-conditioning system A1 for the vehicle according to an embodiment of the present invention. The method for controlling the air-conditioning system A1 for the vehicle according to the embodiment of the present invention is to control the air-conditioning system A1 illustrated in FIGS. 21 and 22, and includes an inputting step S21, an air-conditioning module operating step S22, a first judging step S23, a second judging step S24 and a cooling and heating module operating step S25.

The inputting step S21 is the step of inputting target temperature of the interior of the vehicle through the input part I.

The air-conditioning module operating step S22 is the step of operating the air-conditioning module D2 when the inputting step S21 is carried out.

The first judging step S23 and the second judging step S24 are steps carried out in order to judge operation of the cooling and heating module D1. The first judging step S23 is the step of checking whether or not indoor temperature measured through the temperature sensor T is within a temperature limit section. The temperature limit section is a range that the cooling and heating module D1 can perform air-conditioning. The temperature limit section may be a specific temperature section or may be more than a value that the specific temperature is subtracted from the target temperature or less than a value that the specific temperature is added to the target temperature.

The second judging step S24 is the step of judging whether or not a difference between the indoor temperature and the target temperature exceeds set temperature if the indoor temperature is within the temperature limit section in the first judging step S23.

In the cooling and heating module operating step S25, the cooling and heating module D1 is operated if the difference between the indoor temperature and the target temperature exceeds set temperature in the second judging step S24.

That is, the first judging step S23 is the step of judging whether or not the cooling and heating module D1 is operated not to discharge the battery B, and the second judging step S24 is the step of judging whether or not it is necessary to cool or heat the interior of the vehicle by operation of the cooling and heating module D1.

Figure 26:
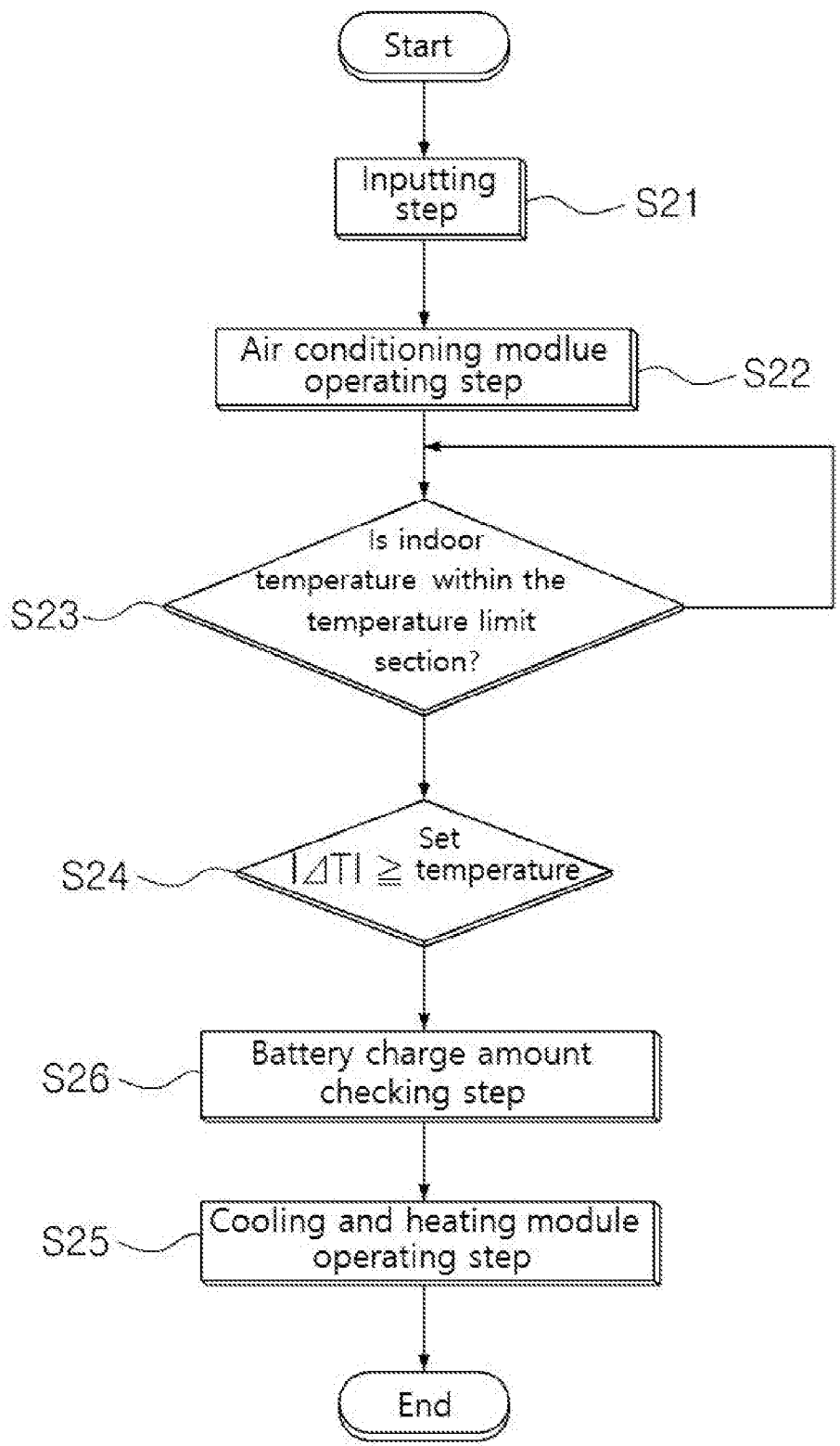
FIG. 26 is a view showing a method for controlling the air-conditioning system for the vehicle according to another embodiment of the present invention.

FIG. 26 is a view showing a method for controlling the air-conditioning system A1 for the vehicle according to another embodiment of the present invention. The method for controlling the air-conditioning system A1 in this embodiment further includes a battery charge amount checking step S25.

The battery charge amount checking step S25 is the step of checking a charge amount of the battery B, and can more securely prevent discharge of the battery B because operating the cooling and heating module D1 only when the charge amount of the battery B exceeds a specific value.

Figure 27:
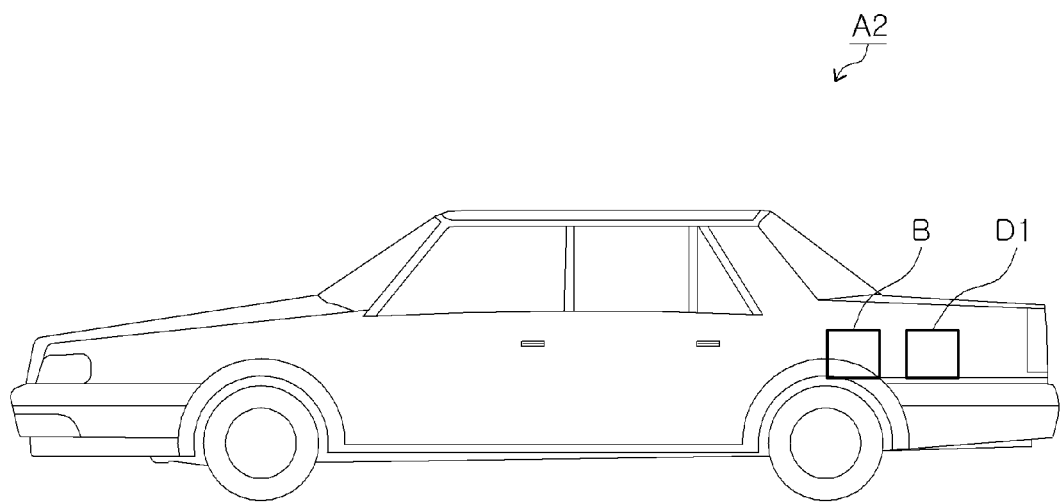
FIGS. 27 and 28 are schematic diagrams of an air-conditioning system for a vehicle (for a battery) according to another embodiment of the present invention.
Figure 28:
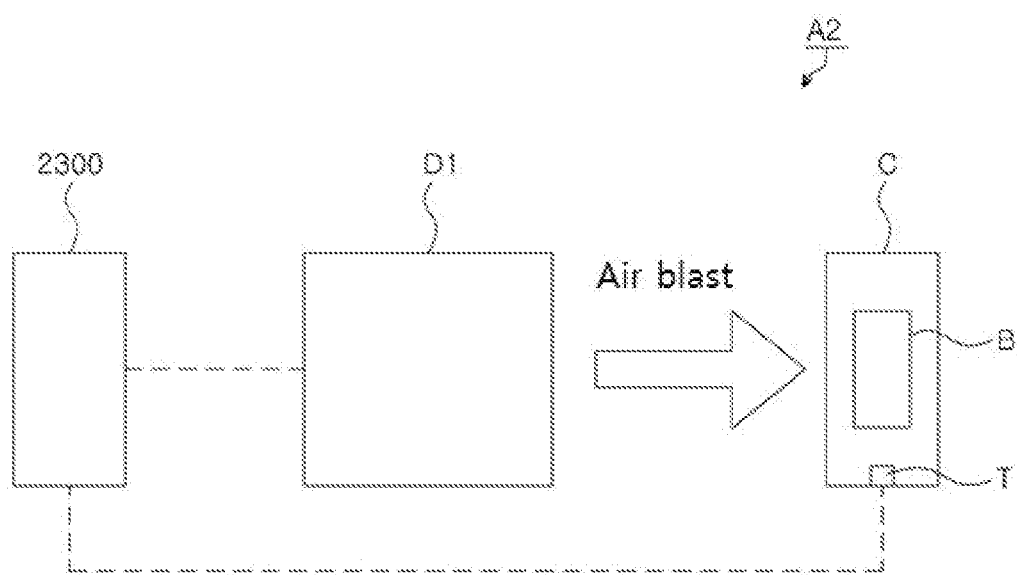

Hereinafter, an air-conditioning system A2 for a vehicle which adjusts temperature of a vehicle battery using the cooling and heating module D1 will be described. FIGS. 27 and 28 are schematic diagrams of the air-conditioning system A2 for the vehicle battery according to another embodiment of the present invention. Hereinafter, the air-conditioning system A2 for the vehicle which adjusts temperature of the vehicle battery is defined as a battery air-conditioning system A2 in order to discriminate from the air-conditioning system A1 for air-conditioning the interior of the vehicle. The battery air-conditioning system A2 according to the present invention includes a battery case C, the above-mentioned cooling and heating module D1, a temperature sensor T and a third control part 2300.

The battery case C accommodates the battery B therein and has a closed space for putting the battery B.

The cooling and heating module D1 has the above-mentioned characteristics, and easily adjusts temperature of the battery B when air supplied through the first vent 760 is supplied to the battery case C. In this instance, the cooling and heating module D1 and the battery case C may be directly connected with each other or may be connected with each other through an air blower pipe.

The temperature sensor T is to measure temperature of the battery B, and is mounted inside or outside the battery case C.

The third control part 2300 compares actual temperature measured through the temperature sensor T with favorable temperature of the battery B and controls operation of the cooling and heating module D1. In other words, the third control part 2300 controls the heated air passing through the condenser 200 to be supplied through the second-first inflow part 753, the first space part 711 and the first vent 760 when the actual temperature is less than the minimum favorable temperature, but controls the cooled air passing through the evaporator 400 to be supplied through the first-first inflow part 751, the first space part 711 and the first vent 760 when the actual temperature exceeds the maximum favorable temperature.

Therefore, the battery air-conditioning system A2 according to the present invention can maintain the favorable temperature of the battery B to maintain performance of the battery B stably and can be easily installed in the form of a module.

As described above, the cooling and heating module D1 according to the present invention is the small-sized module which can perform heating and cooling to air-condition the interior and the exterior of the vehicle or control temperature of the battery, and can be used independently or used to support the air-conditioning module D2. In this instance, the cooling and heating module D1 can be easily attached and detached to perform cooling or heating outdoors.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An air-conditioning system for a vehicle comprising:
a cooling and heating module; and
a battery for operating the cooling and heating module,
wherein the cooling and heating module including:
   a compressor for inhaling and compressing refrigerant;
   a condenser for condensing the refrigerant compressed in the compressor;
   an expansion valve for throttling the refrigerant condensed in the condenser;
   a first evaporator for evaporating the refrigerant supplied through the expansion valve;
   a first-first blowing part for blowing air to be cooled after passing through the first evaporator;
   a first-second blowing part for blowing air to be heated after passing through the condenser; and
   a discharge duct for delivering at least one of the air to be cooled and the air to be heated, which is selectively supplied through the first-first blowing part and the first-second blowing part by opening and closing means, to a supply side, the discharge duct including an outer body having a first-first inflow part, a first-second inflow part, a second-first inflow part, a second-second inflow part each for receiving the at least one of the air to be cooled and the air to be heated, wherein the opening and closing means selectively opens and closes the first-first inflow part, the first-second inflow part, the second-first inflow part, and the second-second inflow part, and wherein a first partition, a second partition, and a third partition cooperate with each other to form a first space part and a second space part on the discharge duct;
wherein the cooling and heating module further includes a base part having a first mounting recess hollowed at a first area of the base part to deliver air to the first evaporator, and a second mounting recess hollowed at a second area of the base portion to deliver air to the condenser.

2. The air-conditioning system according to claim 1, wherein the opening and closing means delivers the air cooled after passing through the first evaporator to the supply side and discharges the air heated after passing through the condenser to the outside in a cooling state, and wherein the opening and closing means discharges the air cooled after passing through the first evaporator to the outside and delivers the air heated after passing through the condenser to the supply side in a heating state.

3. The air-conditioning system according to claim 1, wherein the cooling and heating module is detachably mounted on the vehicle.

4. The air-conditioning system according to claim 3, wherein the cooling and heating module is independently controllable.

5. The air-conditioning system according to claim 1, wherein in the cooling and heating module, the supply side is an interior of the vehicle.

6. The air-conditioning system according to claim 1, wherein in the cooling and heating module, the supply side is a battery.

7. The air-conditioning system according to claim 1, comprising a plurality of the cooling and heating modules.

8. The air-conditioning system according to claim 7, wherein the cooling and heating modules are a first cooling and heating module disposed under a first seat on which a driver sits; a second cooling and heating module disposed under a second seat which is adjacent to the first seat in a width direction of the vehicle; a third cooling and heating module disposed under a third seat which is adjacent to the first seat in a length direction of the vehicle; and a fourth cooling and heating module disposed under a fourth seat which is adjacent to the third seat in the width direction of the vehicle.

* * * * *